US006493191B1

(12) United States Patent
Cain et al.

(10) Patent No.: US 6,493,191 B1
(45) Date of Patent: *Dec. 10, 2002

(54) PLANAR MAGNETIC RING HEAD FOR CONTACT RECORDING WITH A RIGID DISK

(75) Inventors: William C. Cain, San Jose, CA (US); Richard D. Anderson, Sunnyvale, CA (US); Michael A. Baldwinson, Cupertino, CA (US); Keith R. Berding, San Jose, CA (US); Michael E. Devillier, San Jose, CA (US); Garrett A. Garrettson, Los Altos Hills, CA (US); Randolph S. Gluck, San Jose, CA (US); Harold J. Hamilton, Santa Clara, CA (US); Robert D. Hempstead, Los Gatos, CA (US); Darren T. Imai, Los Gatos, CA (US); Kwang K. Kim, Saratoga, CA (US); Dimitre A. Latev, San Jose, CA (US); Alexander P. Payne, Ben Lomond, CA (US); David D. Roberts, Santa Cruz, CA (US)

(73) Assignee: Censtor Corporation, Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/528,890

(22) Filed: Sep. 15, 1995

Related U.S. Application Data

(63) Continuation-in-part of application No. 08/515,140, filed on Aug. 15, 1995, and a continuation-in-part of application No. 08/338,394, filed on Nov. 14, 1994, which is a continuation-in-part of application No. 07/966,095, filed on Oct. 27, 1992, now Pat. No. 5,550,691, which is a continuation-in-part of application No. 07/783,509, filed on Oct. 28, 1991, now abandoned, which is a continuation-in-part of application No. 07/632,958, filed on Dec. 21, 1990, now Pat. No. 5,073,242, which is a continuation-in-part of application No. 07/441,716, filed on Nov. 27, 1989, now Pat. No. 5,041,932.

(51) Int. Cl.$^7$ .............................................. G11B 5/187
(52) U.S. Cl. ................. 360/246.2; 360/246.1
(58) Field of Search ................. 360/122, 125, 360/126, 104, 97.01, 97.02, 246.1, 246.2

(56) References Cited

U.S. PATENT DOCUMENTS 3,593,326 A * 7/1971 Turner et al. ............... 360/103
3,754,104 A   8/1973 Piper et al. .............. 179/100.2

(List continued on next page.)

OTHER PUBLICATIONS

Daniel Chapman, "A New Approach To Making Thin Film Head–Slider Devices", IEEE Transactions on Magnetics, vol. 25, No. 5, Sep. 1989, pp. 3686–3688.*

Autino et al, IEEE Transactions on Magnetics, vol. 28, No. 5, Sep. 1992, *Compatibility of Silicon Planar Heads with Conventional Thin Film Heads in Hard Disk Drives.**

Primary Examiner—William Korzuch
(74) Attorney, Agent, or Firm—Mark Lauer

(57) ABSTRACT

A transducer for a hard disk drive system has a planar magnetic core and a pair of poletips that project transversely from the core for sliding contact with the disk during reading and writing. The transducer is formed entirely of thin films in the shape of a low profile table having three legs that slide on the disk, the poletips being exposed at a bottom of one of the legs for high resolution communication with the disk, the throat height of the poletips affording sufficient tolerance to allow for wear. The legs elevate the transducer from the disk sufficiently to minimize lifting by a thin air layer that moves with the spinning disk which, in combination with the small size of the thin film head allows a low load and a flexible beam and gimbal to hold the transducer to the disk. The transducer includes a loop shaped core of magnetic material that ends at the poletips, the core extending further parallel than perpendicular to the disk surface and preferably being formed of a plurality of slightly spaced ribbons of magnetic material in order to increase high frequency permeance. A high magnetic saturation layer may be formed adjoining the gap in at least the trailing poletip, in order to avoid saturation at the poletips during writing. The dimensions of the yoke adjacent to the poletips are also designed to avoid saturation at the poletips by saturating at a lower flux in the yoke than the poletips. The close relationship between the transducer and the media of the disk affords high density magnetic data storage and retrieval.

20 Claims, 14 Drawing Sheets

U.S. PATENT DOCUMENTS

| | | | |
|---|---|---|---|
| 4,698,708 A | 10/1987 | Lazzari | 360/103 |
| 4,731,157 A | 3/1988 | Lazzari | 156/643 |
| 4,819,091 A | 4/1989 | Brezoczky et al. | 360/97.01 |
| 4,901,185 A | 2/1990 | Kubo et al. | 360/104 |
| 4,949,207 A * | 8/1990 | Lazzari | 360/126 |
| 5,041,932 A * | 8/1991 | Hamilton | 360/104 |
| 5,065,271 A | 11/1991 | Matsuura et al. | 360/126 |
| 5,111,351 A * | 5/1992 | Hamilton | 360/126 |
| 5,196,976 A | 3/1993 | Lazzari | 360/113 |
| 5,198,934 A | 3/1993 | Kubo et al. | 360/104 |
| 5,278,711 A | 1/1994 | Gregory et al. | 360/103 |
| 5,303,096 A * | 4/1994 | Keller | 360/97.01 |
| 5,305,165 A | 4/1994 | Brezoczky et al. | 360/103 |
| 5,327,310 A | 7/1994 | Bischoff et al. | 360/103 |
| 5,432,645 A * | 7/1995 | Terunuma et al. | 360/126 |
| 5,434,733 A | 7/1995 | Hesterman et al. | 360/113 |
| 5,473,485 A | 12/1995 | Leung et al. | 360/103 |
| 5,490,028 A * | 2/1996 | Ang et al. | 360/126 |
| 5,539,596 A * | 7/1996 | Fontana et al. | 360/104 |

\* cited by examiner

PLANAR MAGNETIC RING HEAD FOR CONTACT RECORDING WITH A RIGID DISK

CROSS REFERENCE TO RELATED APPLICATIONS

This application is a continuation-in-part of pending U.S. patent application Ser. No. 08/515,140, filed Aug. 15, 1995, and is also a continuation-in-part of pending U.S. patent application Ser. No. 08/338,394, filed Nov. 14, 1994 which is a continuation-in-part of issued U.S. Pat. No. 5,550,691, filed Oct. 27, 1992 as U.S. patent application Ser. No. 07/966,095, which is a continuation-in-part of abandoned U.S. patent application Ser. No. 07/783,509, filed Oct. 28, 1991, which is a continuation-in-part of U.S. patent application Ser. No. 07/632,958, filed Dec. 21, 1990, now U.S. Pat. No. 5,073,242, which is a continuation-in-part of U.S. patent application Ser. No. 07/441,716, filed Nov. 27, 1989, now U.S. Pat. No. 5,041,932. All of the above materials are hereby incorporated by reference into this application.

TECHNICAL FIELD

The present invention relates to hard disk drive systems having transducers including a magnetic core with a gap adjacent to a magnetic storage disk.

BACKGROUND OF THE INVENTION

Hard disk drives have traditionally employed electromagnetic transducers that are spaced from a rapidly spinning rigid disk by a thin layer of air that moves with the disk surface. Such an air layer helps to avoid damage between the rapidly spinning disk and the essentially stationary transducer, which is constructed with a large, aerodynamic "slider" designed to "fly" over the surface, buoyed by the moving air layer. The air layer, however, creates an additional space between the transducer and the magnetic medium of the disk that is used to store information. This spacing lowers the density with which data can be stored and lowers the resolution and amplitude with which data can be retrieved.

Conventional flying heads have a pair of poletips formed by thin film processes on a back end of the slider and terminating coextensively with the slider air bearing surface. In flight, the slider is tipped so that the back end is lower than the front end and the poletips are closer to the disk than the remainder of the slider. Other flying heads, representative of which is U.S. Pat. No. 4,698,708 to Lazarri, have poletips that are flush with the air bearing surface of the slider partially between the front and back ends.

In an attempt to lower the spacing loss and thereby increase resolution and amplitude, transducer flying heights have generally decreased over many years in the magnetic recording industry. Lowering the flying height, however, encounters a countervailing problem of catastrophic head crash that occurs when the transducer impacts the rapidly spinning disk. In recent years a solution to the conflict between flying height and head crash has been achieved by designing the drive system so that the head supporting structure is run in continuous sliding contact with the disk, which can reduce the problem of impact between the head and disk and decrease the spacing between the head and disk. Any perturbation that causes separation between the head and disk, however, can result in a crash when the two recontact. Such a perturbation can be due to a shock to the drive, such as would occur from accidental bumping of the drive or its support, or can be due to the presence on the disk surface of an asperity or debris. Note that in either situation, a potentially destructive impact can occur due to the initial perturbation, instead of or in addition to the crash upon recontact.

In U.S. Pat. No. 5,041,932, Hamilton discloses a transducer that operates in contact with a rigid disk surface without destructive head crash, essentially by designing the mechanical and inertial characteristics of the transducer to conform to the rapidly spinning rigid disk without damage to the disk or transducer. A different approach for a hard disk drive system for allowing operational contact between the head and the disk is disclosed in U.S. Pat. No. 4,819,091 to Brezoczky et al., which proposes that nondestructive wear may be possible provided that the slider material is so much more thermally conductive than the disk that the slider surface is maintained at a lower temperature than the much larger disk surface as the slider rubs on the disk. And U.S. Pat. No. 4,901,185 to Kubo et al. teaches operational contact between a disk and a slider having a head appended and spaced from contacting the disk to avoid damage to the head. More recently, U.S. Pat. No. 5,327,310 to Bischoff et al. teaches a transducer similar to that disclosed in the Hamilton patent but having a ring-shaped transducer mounted vertically on a trailing end of a slider that makes intermittent, bouncing contact ("pseudo-contact") with the disk.

An object of the present invention is to provide a transducer optimized for minimal head-medium spacing during longitudinal recording on and reading from the medium. A related object is for such a transducer to be stable and biased toward contact with a disk surface without the need for excessive force to hold the transducer to the surface against the lifting force of an air layer that moves with the disk, thereby avoiding problems of vibration and damage to the disk and/or transducer. In concert with the above objects it is desired to provide a transducer having efficient electromagnetic signal transduction.

SUMMARY OF THE INVENTION

The above objects are achieved with a transducer shaped like a low-profile table with three short support legs that slide on the medium surface during information transfer between the transducer and the medium. The transducer includes a magnetic core which stretches like a shallow, symmetric loop within the plane of the table, with ends of the loop extending into one of the legs to form a pair of closely spaced magnetic poletips exposed to the disk surface in close proximity to the medium. Inductively coupled to the core is a conductive coil that spirals in opposite directions around laterally opposed sections of the core, the spirals stacked like pancakes centered on the opposed core sections. The core and the coil extend substantially further in the plane of the table top than along the direction with which the legs project, affording the mechanically and aerodynamically favorable low profile shape. The table top may be T-shaped or trapezoidal, reducing the mass of the transducer and increasing the number of transducers that can be obtained per wafer while retaining three-legged stability.

During writing of information to the medium, a current in the coil creates a magnetic field along the length of the loop shaped core, creating a magnetic field that spans the microscopic gap between the ends of the core and induces a similarly directed magnetic field in the adjacent media layer. Since the poletips are in contact with the disk surface and have an extremely small gap, very high resolution writing of information can be accomplished with this system. Unlike conventional heads which have tight tolerances for vertical throat height, the dimensions of the planar core of the present invention allow the throat height to vary substantially without impeding writing and reading efficiency, affording tolerance for wear of the sliding poletips. Additionally, the planar core allows the head to assume a relatively flat, stable, low-profile conformation with lower moment arms about the head-disk contact area, including both a lower moment of inertia of the chip and a lower effective mounting point of the beam holding the chip.

Reading of magnetic patterns imbued in the medium occurs due to the changing magnetic field seen by the poletips from the spinning disk on which the tips slide, creating a voltage in the inductively coupled coil that is read as a signal. Due to the intimate contact between the poletips and the recording surface, very high signal resolution and amplitude is achieved. In order to increase the high frequency permeance of the head, the core is formed of elongated strips, layers or filaments. Additionally, the poletips may be coated with a high magnetic saturation material adjacent to the gap in order to provide an intense magnetic field across the gap without saturation, even at field strengths of up to and exceeding 10,000 Gauss. In a preferred embodiment, the core is shaped like a clamshell, allowing formation of several coil layers within the core without unnecessarily increasing the reluctance of the core.

The low-profile, three-legged transducer is attached via a gimbal to a load beam to present a dynamic configuration that closely and rapidly conforms to a spinning disk so as to maintain contact and high resolution communication with the medium. Due to the small legs, which act like short stilts lifting the rest of the transducer above the thin moving air layer that adjoins the disk, little of the transducer is impinged upon by that thin moving air layer, and so minimal lifting force is generated that must be overcome to maintain contact. The interconnection between the transducer and the gimbal is made with exposed conductive bumps that pierce and are anchored to an outer insulative layer of the transducer, providing mechanical as well as electrical connections. The transducer is built in layers, along with many other transducers, on the surface of a wafer substrate from which the transducers are later removed, allowing the transducer to be much smaller and lighter in weight than conventional transducers that include bulk substrate materials. The legs, including the magnetically active leg containing the projecting poletips, are formed last, allowing careful tailoring of the most sensitive portions of the transducer.

DESCRIPTION OF THE PREFERRED EMBODIMENT

Figure 1:
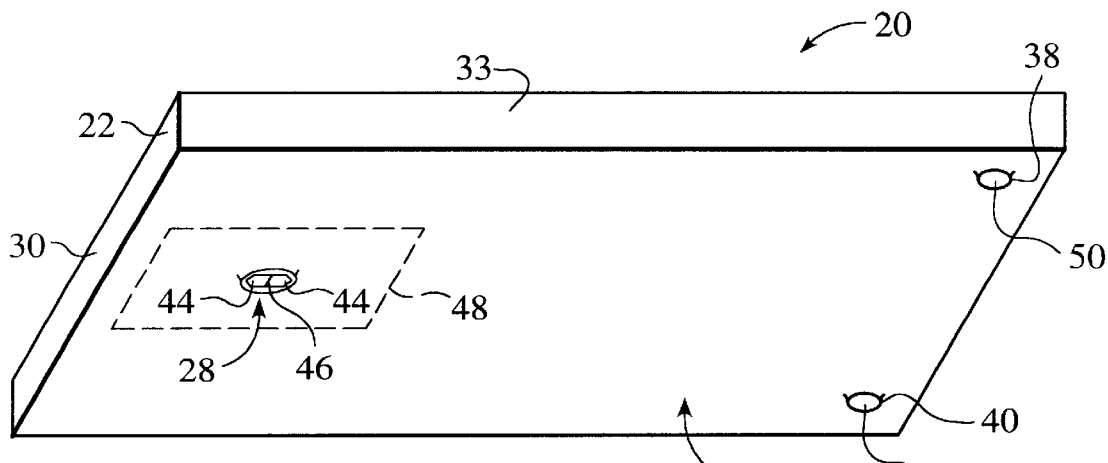
FIG. 1 is an enlarged perspective view of a generally plank-shaped embodiment of a transducer of the present invention with three disk-facing projections.
Figure 2:
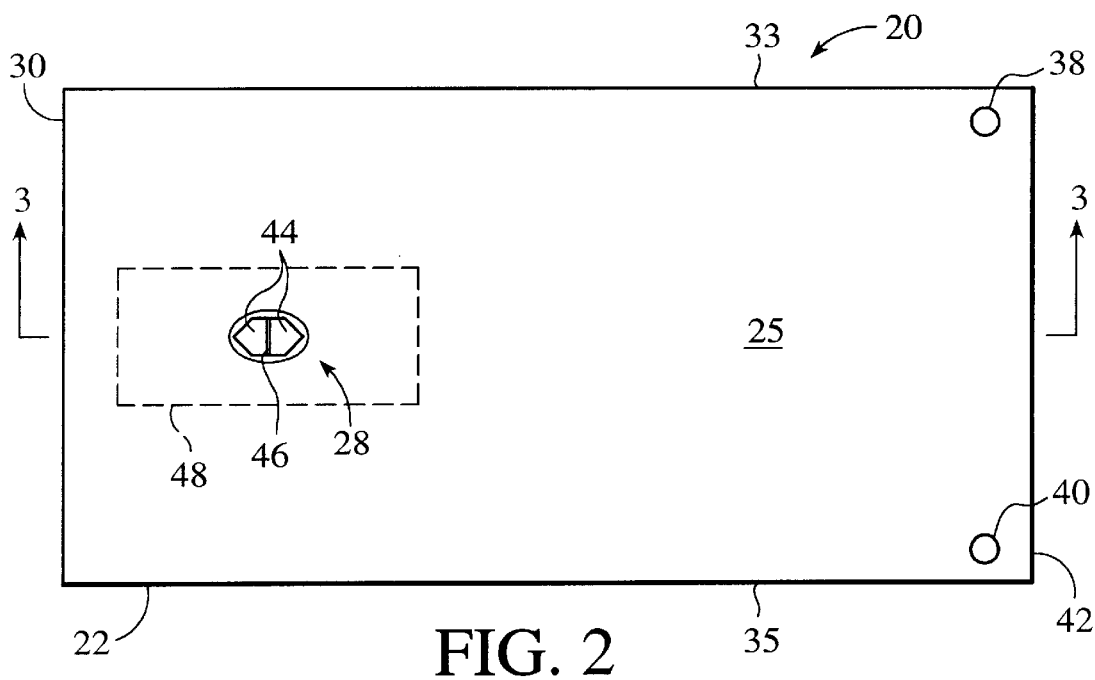
FIG. 2 is a bottom view of the transducer of FIG. 1.

Referring now to FIGS. 1 and 2, a greatly enlarged view of a transducer 20 of the present invention has a generally plank shaped chip 22 with a surface 25 designed to face a recording surface of a rigid magnetic storage disk. The transducer has a magnetically active pad (MAP) 28 that projects from the disk-facing surface 25 at a location adjacent to a first end 30 of the chip 22 and approximately equidistant between a right side 33 and a left side 35 of the chip. A pair of magnetically inactive pads (MIPS) 38 and 40 project from the disk-facing surface 25 adjacent to a second end 42 of the chip 22, MIP 38 being disposed about the same distance from side 33 as MIP 40 is from side 35. The three pads 28, 38 and 40 are spaced apart from each other to provide a stable support structure for the transducer 20, like a table with three short legs that can maintain contact with any conventional disk surface. An exposed pair of magnetic poletips 44 are located on a bottom surface of MAP 28, with an amagnetic gap 46 disposed between the poletips 44. The poletips 44 are ends of a loop-shaped core of magnetic material that is embedded in the chip 22 and not shown in this figure.

As a descriptive aid, a direction generally corresponding to that in which the MAP 28 and MIPS 38 and 40 extend from the surface 25 is termed the "vertical" direction, while an orthogonal direction along the length of the sides 33 and 35 is termed the "longitudinal" direction. A direction orthogonal to both the vertical and longitudinal directions and corresponding generally with an elongated direction of ends 30 and 42 is termed the "lateral" direction. Elements of the chip 22 designed to be closer to a disk are commonly called "bottom" elements while those that will be employed further from the disk are called "top" elements, although a typical disk will have a chip 22 sliding on both disk surfaces. Moreover, as will be seen, the chips 22 are built in layers beginning with the side that will be positioned furthest from the disk, so that during production some "top" elements are formed beneath some "bottom" elements.

The loop-shaped core extends within a transduction section 48 further in the longitudinal direction than in the vertical or lateral direction, and is inductively coupled within that area 48 to a coil which winds repeatedly around the core, as will be seen in greater detail below. The protrusion of the poletips 44 from the disk-facing surface 25 allows the core to contact the disk, reducing the spacing between the core and the media layer of the disk while lifting the disk-facing surface of the chip 22 from the influence of the thin film of air moving with the disk. As will be seen, the entire chip 22 is constructed of a composite of thin films, and any bulk substrate which was used as a work surface for forming many thousands of such chips is removed after formation of the chips. This thin film composite chip 22 is much lighter than conventional sliders which include bulk substrate, the lighter weight decreasing the inertia of the chip and the power of impacts between the chip and a hard disk, thus reducing the probability of damage.

The chip 22 may have a thickness measured in the vertical direction between the disk-facing surface 25 and an opposed major surface, not shown in this figure, of between about 1 mil and about 5 mils, although other thicknesses may be possible, depending upon tradeoffs such as magnetic constraints and mass. The lateral width of this embodiment of the chip 22 is about 20 mils, although this width can vary by more than a factor of two and is set primarily by the separation of the MIPS 38 and 40 required for stability. The width can be much smaller about the MAP 28, as discussed below, while still encompassing the transduction section 48. The MAP 28 and MIPS 38 and 40 extend from the surface 25 an approximately equidistant amount, which may range between about 2 $\mu$m and 8 $\mu$m, which is sufficient to avoid aerodynamic lifting and to allow for gradual wear without engendering fracturing of those pads or instability of the transducer 20. The aerodynamic lifting force is believed to be primarily due to the disk-facing area of the chip which is in close proximity with the disk, including the contact area of the pads, and any bowing or tilting of the chip. As will be explained in greater detail below, the chip 22 may be intentionally bowed, tilted and/or etched to create a negative pressure region between the chip 22 and the spinning disk, so that the lifting force from the disk-facing area of the chip is more than overcome by downward force of the negative pressure. An area 50 of each of the MIPS 38 and 40 may be as small as 25 $\mu m^2$ or as large as about 1000 $\mu m^2$, although other sizes are possible based upon tradeoffs including, for example, friction, pad wear and manufacturing tolerances. An aspect ratio of the vertical height to the lateral or longitudinal width of those pads should not be much over 2/1 to avoid fracturing and transducer inefficiency. The length of the chip 22 of this embodiment as measured between the first end 30 and the second end 42 is about 40 mils, although this can be varied by a factor of two. This aspect ratio is determined primarily by mechanical considerations regarding the separation of the MIPS 38 and 40 and the MAP 28, as limited by the space needed for the transduction section 48.

Figure 3:
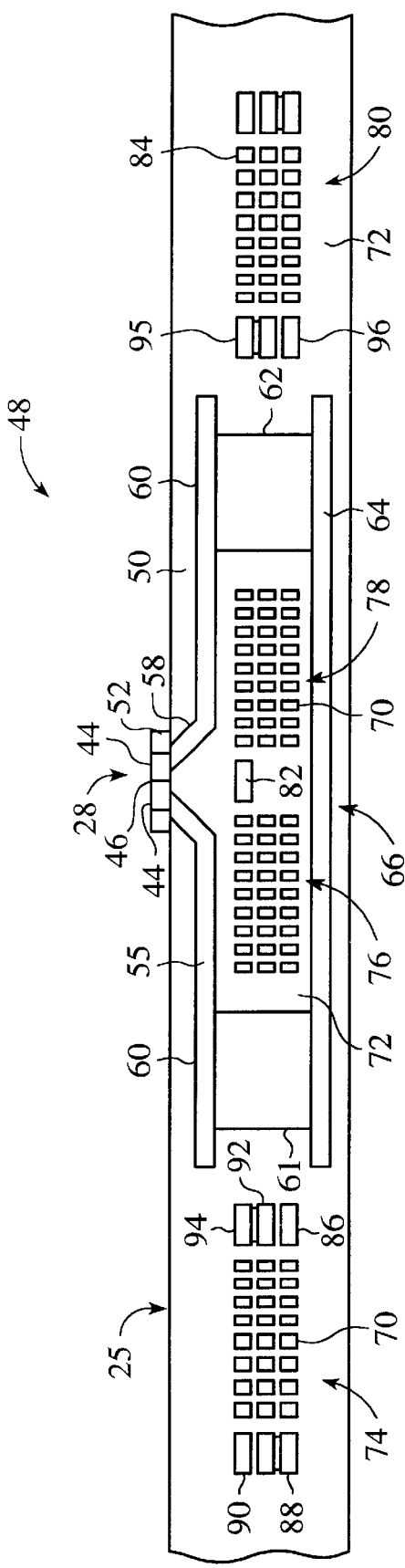
FIG. 3 is a cross-sectional view of a magnetically active portion of the transducer of FIG. 1.

In FIG. 3, a cross-section of the chip that focuses on the transduction section 48 is shown along a cross-section bisecting the MAP 28, the poletips 44 and the gap 46. A lower layer 50 which preferably is made of alumina, but which alternatively may be made of another electrically insulative, amagnetic material such as doped silicon, silicon dioxide or diamond like carbon (DLC) forms the disk-facing surface 25, while a hard, wearable casing 52 which is preferably made of DLC or another hard amagnetic material such as silicon carbide or boron nitride forms the portion of the MAP 28 surrounding the poletips 44. The gap 46 is preferably formed of an insulative, amagnetic material such as silicon or silicon dioxide which is softer than the hard wear material of the casing 52. Hydrogenated carbon is a desirable gap 46 material, having a hardness that can be adjusted to correspond with the particular poletip 44, casing 52 and disk surface characteristics. The wear material of the casing 52 is preferably made of an amorphous material such as DLC which has a hardness similar to that of a surface layer of the disk with which the transducer 20 is to be employed, for matching wear between the transducer and the disk. The casing may be thicker closer to the disk-facing surface 25 for manufacturing and durability. Adjoining the poletips 44 is a bottom yoke 55 of magnetic material which extends symmetrically from a pair of slanted sections 58 to a pair of generally planar sections 60. The poletips 44 and yoke sections 58 and 60 are formed from permalloy or other known magnetic materials, while at least one of the poletips may include a high magnetic moment material, such as cobalt niobium zirconium (CoZrNb), iron nitride (FeN) or iron nitride alloys such as FeNAl adjacent to the gap 46. The yoke sections 58 and 60 are preferably formed in a laminated fashion, to be described below, in order to reduce eddy currents that impede transducer efficiency at high frequencies. Adjoining the yoke sections 60 are a pair of magnetic studs 61 and 62 that extend to a generally planar magnetic top yoke 64 interconnecting the studs 61 and 62. The poles 44, bottom yoke 55, studs 61 and 62 and top yoke 64 form a generally loop-shaped magnetic core 66, creating a contiguous magnetic circuit except for the small amagnetic gap 46. In a preferred embodiment discussed below, the studs are eliminated, and the core is formed in a shape having a cross-section that resembles a clamshell.

A series of electrically conductive coil sections 70 made of copper or other conductive metals or alloys is shown in cross-section in FIG. 3 to be spaced both within and without the magnetic core 66. Interspaced between the coil sections 70 and the core 66 is an electrically insulative spacer material 72 such as $Al_2O_3$, $Si\ O_2$ or a hardbaked photoresist or other polymer. The coil sections 70 can be seen to be divided into three generally horizontal layers in this embodiment, although more or less layers are possible, depending upon manufacturing and magnetic tradeoffs. These layers of coil sections 70 can also be seen to fall into four horizontally separate groups. Proceeding from left to right, these groups are labeled 74, 76, 78, and 80, with a crossover section 82 connecting groups 76 and 78. Although difficult to see in the cross-sectional view of FIG. 3, the coil sections 70 are in actuality a single coil 84 which winds repeatedly about first one and then the other of the two studs 61 and 62. The groups 74 and 80 which are disposed outside the core 66 have an electric current during writing or reading which is directed into or out of the plane of the paper opposite to that of groups 76 and 78 and crossover section 82. The reader may wish to jump ahead temporarily to FIG. 12, which shows a top view of one layer of the spiraling coil 84, including crossover 82.

Thus a current traveling into the plane of the paper at coil section 86 would spiral in the layer of that section 86 around stud 61 with a generally increasing distance from the stud 61 until reaching section 88, which is connected to section 90 of the next layer. The current would then spiral inwardly about stud 61 in the layer of section 90 until reaching section 92, which is connected to section 94 of the next layer. The current would then spiral outwardly around stud 61 in the layer that includes section 94 until reaching crossover section 82, at which point the current would begin to spiral inwardly about stud 62, traveling to the second layer at section 95. The layered spiraling of the current around stud 62 would continue in a similar but converse fashion to that described above for the spiraling about stud 61, until the current exited the coil structure by traveling out of the plane of the paper at section 96. The coil 84 thus resembles interconnected stacks of pancake-shaped spirals centered about studs 61 and 62.

Representative dimensions for this embodiment include an approximately 3 $\mu$m thick bottom yoke 55 and a top yoke 64 that is about 4 $\mu$m in thickness, and studs 61 and 62 which each extend vertically about 23 $\mu$m between the yokes. The thickness of the bottom yoke 55 is selected to saturate at a somewhat lower magnetic flux than the poletips, thus limiting the flux through the poletips and avoiding broadening of the transistion that would occur during poletip saturation. In order to achieve this flux limiting effect with poletips of different sizes and materials, a function can be employed to determine the optimum bottom yoke parameters. The individual coil sections 70 are about 3.5 $\mu$m thick measured in the vertical direction, and have a center to center spacing of about 5.5 $\mu$m in that direction. Longitudinally, those sections 70 may be about 2 $\mu$m to 4 $\mu$m thick within the core 66 with a center to center spacing of about 4 $\mu$m. The top yoke 64 extends about 169 $\mu$m longitudinally, and the bottom yoke 55 extends similarly but is, of course, split up by the poletips 44 and gap 46.

Figure 4:
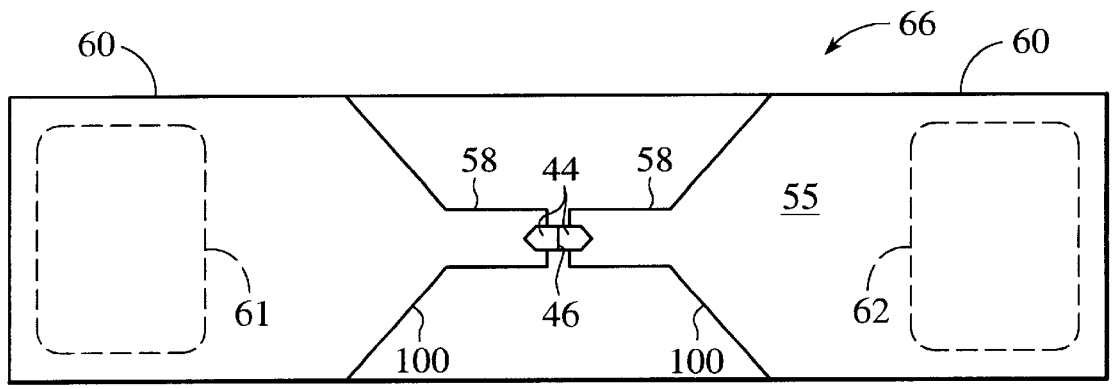
FIG. 4 is an opened up bottom view of the magnetically active portion of FIG. 3.

In FIG. 4, a top view diagram of the magnetic core 66 shows that the bottom yoke 55 is shaped like a bow-tie, as the slanted sections 58 are much narrower in lateral dimension than the planar sections 60. Diagonal tapered portions 100 of the planar sections 60 funnel magnetic flux into the narrower section 58 during a write operation and offer a low reluctance path for such flux during a read operation. Centered atop the slanted sections 60 are the poletips 44, which are separated by the amagnetic gap 46. The planar sections 60 have a width, excluding the tapered sections 100, of about 42 $\mu$m, which tapers at about a 45 degree angle to a width of about 7 $\mu$m at the slanted sections 58. The studs 61 and 62 meet the planar sections 60 distal to the poletips 44.

Figure 5:
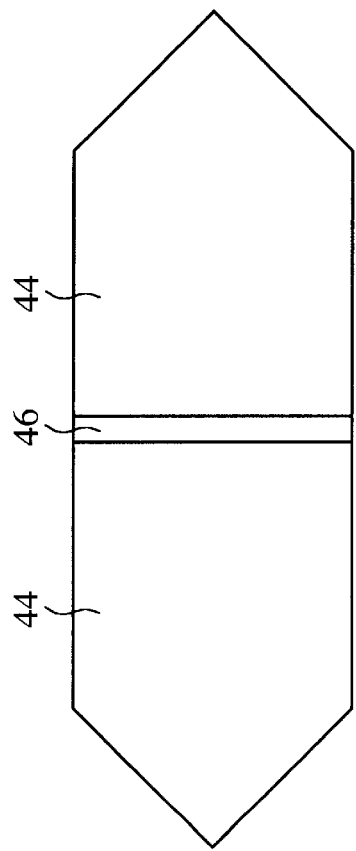
FIG. 5 is a further enlarged bottom view of the magnetic pole structure of FIG. 4.

An even more enlarged view in FIG. 5 shows that the poletips 44 are shaped like baseball homeplates that nearly meet along parallel sides, separated by the long, narrow gap 46. The poletips 44 and gap 46 are exactingly tailored to precise dimensions that are chosen based on a number of parameters. The specific embodiment depicted in FIG. 5 has poletips that each measure 3.25 $\mu$m in the lateral dimension and 4 $\mu$m in the longitudinal direction, before tapering to extend another 2 $\mu$m longitudinally. The peak-to-peak longitudinal dimension of the poletips 44 and gap 46 is 12 $\mu$m. The gap 46 has a recisely defined longitudinal dimension of 0.26 $\mu$m and a lateral dimension of 3.25 $\mu$m.

Figure 6:
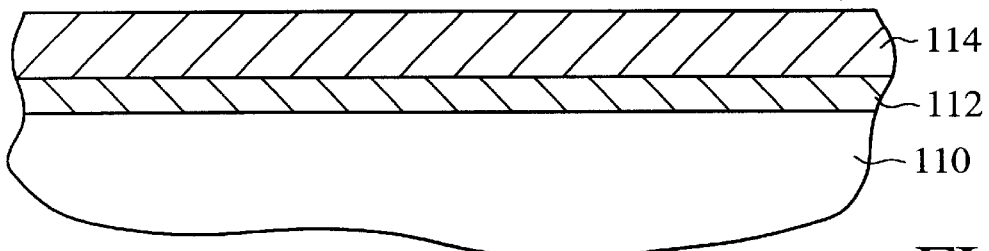
FIG. 6 is a cross-sectional view of an early step in a fabrication process of the transducer of FIG. 1, showing the formation of a conductive etchable release layer for the transducer on a wafer substrate.

Beginning with FIG. 6, a process for making the chip 22 is shown. Atop a ceramic wafer substrate 110 such as silicate or hot pressed $Al_2O_3$/TiC which has been cleaned and of which a small portion is shown, a sputtered seed layer 112 of titanium copper (Ti/Cu) of between about 1000 Å and 2000 Å is formed in two steps, by first sputtering a layer of Ti and then sputtering a layer of Cu. The seed layer 112 allows electroplating of a copper (Cu) release layer ("CuRL") 114 which merges with the seed layer 112. The CuRL 114 provides, as will be seen, eventual release of a large number of formed chips 22 from the substrate 110. Other selectively etchable conductive materials could instead be used, but copper offers a highly conductive, cost effective choice for this purpose. The CuRL 114 is formed to a thickness of about 25 $\mu$m or 1 mil and is then annealed and lapped and cleaned to form a planar surface for building the chip 22. The term "lapping" is used in the present invention to describe at least somewhat abrasive rubbing or polishing of a surface that removes irregularities and provides a smooth, planar surface, while generally reducing the thickness of a layer a predictable amount. Forming such planar surfaces on layers that may contain various portions of discrete elements is important for accurate construction of the chip 22 from a number of layers.

Instead of employing a release layer for removal of the chips 22 from the wafer, the wafer may be selectively etched to free the chips. For example, a silicon (Si) wafer may be sputtered with an alumina layer that is to become a side of the chip 22 facing away from a disk. That alumina ($Al_2O_3$) layer is then chemically etched to form holes for a pair of gold interconnect buttons that provide electrical leads between the transducer 20 and the disk drive. A reactive ion etch (RIE) is then performed with $CF_4/O_2$ to extend the holes into the silicon wafer, after which a seed layer is sputtered on the alumina and through the holes. A photoresist mask is then formed surrounding and having a greater diameter than each hole, and then a layer of gold is electroplated to a thickness that substantially exceeds the alumina thickness, so that the gold extends through the holes and protrudes from each side. After the remaining layers of the chips 22 are formed, as will be described in detail below, the wafer is selectively etched, leaving the thin film chips.

Optionally, prior to etching most of the wafer can be ground away, leaving about 2 mils of silicon attached to the alumina layer and gold buttons. While the chips 22 are protected with a photoresist or other covering, the remaining Si wafer is removed with another RIE etch, thereby freeing the chips.

Figure 7:
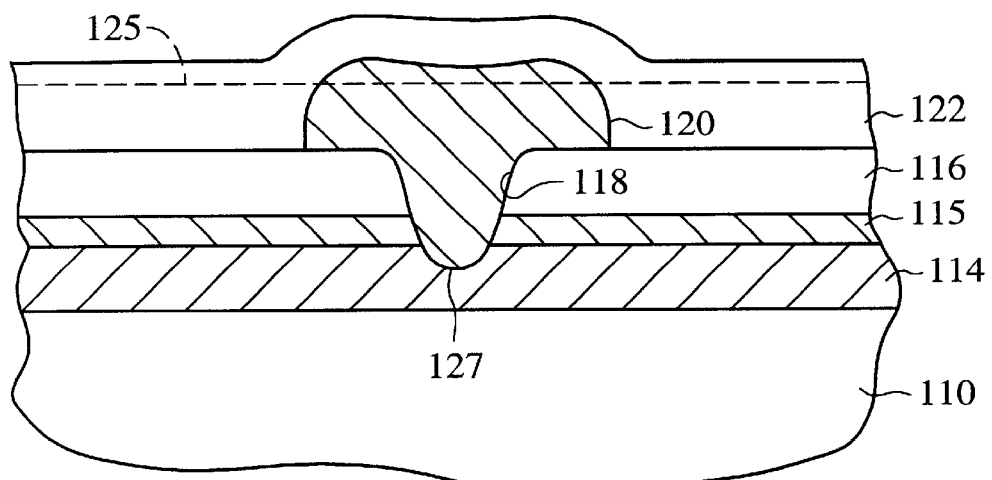
FIG. 7 is a cross-sectional view of a later step in the process of FIG. 6, showing the formation of a gold interconnect button for the transducer.

Returning in FIG. 7 to the process flow that employs a release layer, atop the polished CuRL 114 an adhesion layer 115 of titanium (Ti) is formed, on which a layer 116 of alumina is deposited, although other electrically insulative, amagnetic materials such as silicon dioxide ($SiO_2$) may instead be employed for layer 116. The adhesion layer 115 keeps the CuRL 114 and alumina layer 116 from separating, like a double sided atomic sticky tape, for which materials other than Ti could alternatively be used, such as chromium (Cr) or nickel iron (NiFe). After lapping to leave about 4 $\mu$m thickness and cleaning, the alumina layer 116 is etched to form an interconnect orifice 118, while other similar orifices are formed at this time for test pads, not shown. This etching is preferably accomplished with phosphoric acid ($H_3PO_4$) through a Ti mask which has been sputtered onto the alumina surface and photolithographically patterned and etched. Ion beam etching (IBE) is then performed through the Ti mask in order to extend the orifice 118 partially into the CuRL 114, although the test pad orifices are covered at this time so as to avoid their extension. A gold (Au) button 120 is then electroplated in an area overlapping and filling the orifice 118 and the test pad orifices adjoining the CuRL 114, the button 120 having a vertical thickness near its center of about 15 $\mu$m, and spreading laterally and longitudinally a significant extent. To ensure that the button does not spread too far, a photoresist mask can optionally be formed atop the alumina 116 to define a border around the button 120. Another alumina layer 122 is then deposited, and then lapping is performed to the extent of dashed line 125, leaving the gold button 120 anchored to the alumina 116 and forming a flat surface along line 125, upon which additional layers of the transducer are to be formed.

When CuRL 114 is later removed to release a finished or nearly finished chip 22, a protrusion 127 of the gold button 120 beyond the alumina layer 116 will afford a conductive path to the transducer 20 for a suspension or support, while another similar conductive button, not shown, offers a return path for electrical current and potential. These buttons offer structural as well as electrical connections between the chip 22 and the suspension that allow appreciable torque about the lateral and longitudinal directions, which is beneficial in allowing the chip to conform to the spinning disk surface. A third gold button, also not shown, is formed at a location spaced apart from the other buttons to provide another mechanical connection for the chip. The lateral and longitudinal extension of the button 120, and the similar extension of other buttons that are not shown, in what will become the interior of the chip 22 anchors those connective buttons to the chip.

Figure 8:
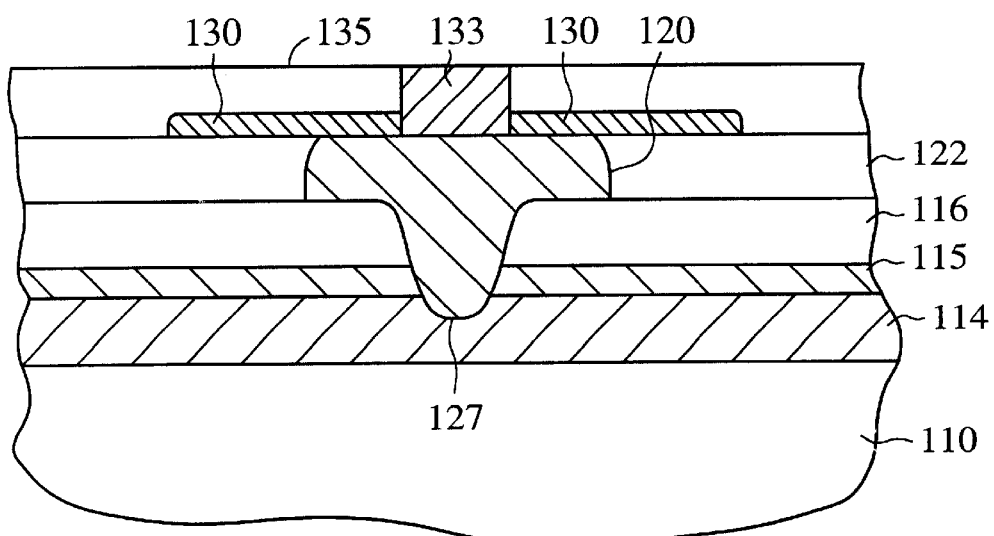
FIG. 8 is a cross-sectional view showing a later stage in the process of FIG. 6, including formation of an interconnect stud.

Referring now to FIG. 8, atop the planarized conductive button 120 a 2500 Å thick layer of Ti is sputtered, which is then patterned using a photoresist mask and ion beam etched to remove unwanted Ti, forming an anti-seepage layer (ASL) 130 which extends laterally and longitudinally beyond the button 120. The IBE also forms target patterns of Ti, not shown, near the perimeter of the wafer for alignment of later steps in the fabrication process. The ASL has been patterned to leave an opening adjoining a middle of the button 120, which is now plated with a copper layer to form an interconnect stud 133. Optionally, a seed layer of Ti/Cu and photoresist plate through mask may first be formed in order to ensure uniform plating of the copper layer, after which the photoresist is removed and then the exposed Ti/Cu seed layer is removed by IBE. An approximately 9 $\mu$m thick alumina isolation layer 135 is then deposited and then lapped flat and cleaned to leave a flat surface including an exposed top of the interconnect stud 133.

Figure 9:
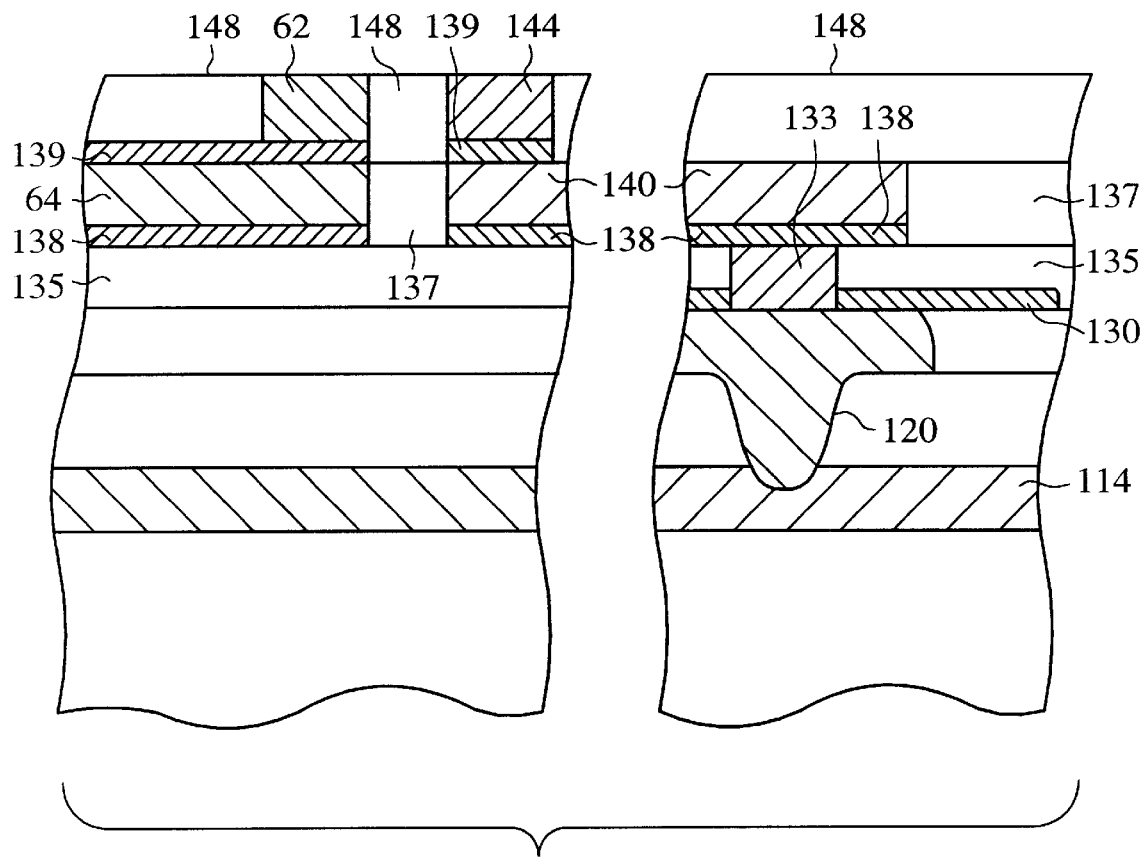
FIG. 9 is a cross-sectional view showing a later stage in the process of FIG. 6, including construction of magnetic yoke layer, magnetic stud section and conductive coil section.

FIG. 9 shows the formation of the top yoke 64 on the alumina isolation layer 135, beginning with the deposit of an electroplating seed layer 138 to a thickness of about 1000 Å. The seed layer 138 is then examined for roughness with a laser surface profiler, as it is important for the formation of the top yoke 64 that roughness of the isolation layer 135 and adjoining seed layer 138 be minimized, in order to reduce noise and increase the efficiency of the top yoke.

Figure 10:
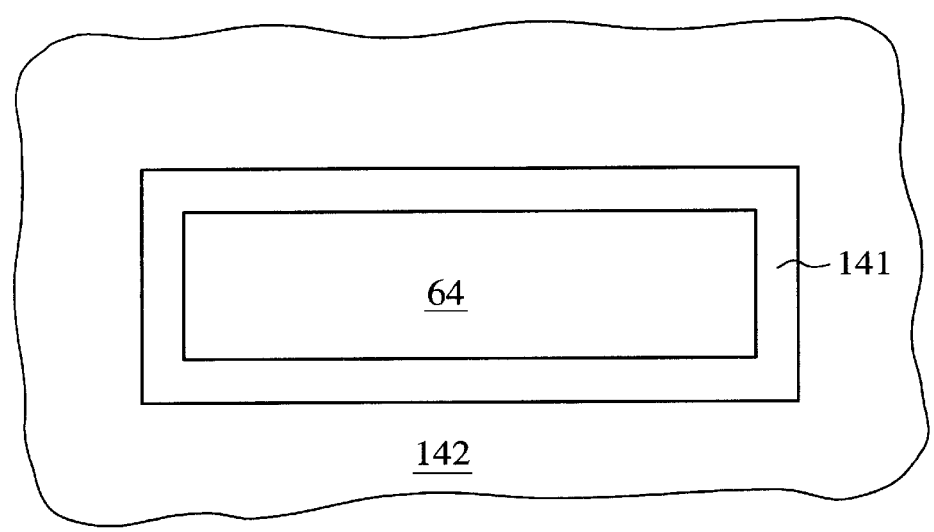
FIG. 10 is a top view of formation of the magnetic yoke of FIG. 9 by window frame plating.

As shown in FIG. 10, the area for the top yoke 64 is then defined by window frame plating, including lithographically forming a resist border 141 of the top yoke on the seed layer 138. The top yoke 64 is then electroplated with NiFe, along with an uncovered area 142 of the seed layer 138 outside the border 141. A laterally directed magnetic field is applied during the electroplating to create magnetic anisotropy in the NiFe yoke 64 having an easy axis of magnetization along the direction of the applied magnetic field, and thereby improve the magnetic characteristics of the top yoke 64. The photoresist border 141 is then removed, and the seed layer 138 that had been covered by that border 141 is thereafter removed by IBE, which also removes a small fraction of the electroplated yoke 64 and outside area 142. Another photoresist mask, not shown, is then formed covering the yoke 64 and extending over a portion of the exposed area which had formerly contained the seed layer 138 that was protected from plating by border 141. The electroplated area 142 not covered with the photoresist mask is then etched away and then the mask removed to leave yoke 64. Window frame plating is employed repeatedly in the current invention to form magnetically permeable elements, which typically involve electroplating NiFe using fairly uniform current densities onto seed layers such as layer 138. The top yoke 64 is preferably formed of "permalloy", which is a NiFe alloy composed of about 80% nickel and 20% iron, by weight, although many other magnetic materials can be used. The top yoke 64 is then examined with energy dispersive X-rays (EDX) to determine the atomic composition of that yoke.

Referring again to FIG. 9, atop the seed layer 138 separate from the top yoke 64 another layer of copper is then plated through a different photoresist pattern exposing stud 133 to form a conductive up lead 140 while the top yoke 64 is covered with photoresist. After removal of the photoresist, an ion beam etch is then performed to remove the seed layer 139 disposed between the top yoke 64 and the up lead 140. A wet "Phillips etch" with dilute hydrogen sulfide ($H_2SO_4$) and hydrogen peroxide ($H_2O_2$) then removes any remaining NiFe not protected with photoresist. In an alternative process, not shown, the seed layer for the up lead 140 can be formed of Ti/Cu in a separate step from the seed layer for the top yoke 64 rather than being simultaneously formed of the NiFe or MoNiFe seed layer used to plate that yoke. Another alumina layer 137 is formed and lapped to expose the up lead 140 and the top yoke 64. A seed layer 139 of nickel iron (NiFe) or molybdenum nickel iron (MoNiFe) is formed on the top yoke 64, the up lead 140 and the alumina layer 137. A photoresist layer, not shown, is then patterned to leave exposed portions of the top yoke 64 for electroplating a pair of magnetic return studs, of which return stud 62 is shown. The return stud 62 is formed by electroplating through a photoresist pattern, the return stud then being examined by EDX to ensure appropriate atomic composition. Another photoresist layer is then patterned that leaves exposed two areas of the up lead 140 for electroplating a pair of copper studs. This pair of studs comprises a center tap stud 144, which is formed on the up lead 140 adjacent to the top yoke 64, while a test stud, not shown in this figure, is formed for testing purposes. Another layer of alumina 148 is then deposited, which is then lapped flat and cleaned to expose the magnetic return stud 62, center tap stud 144 and the test stud, not shown in this figure.

Figure 11:
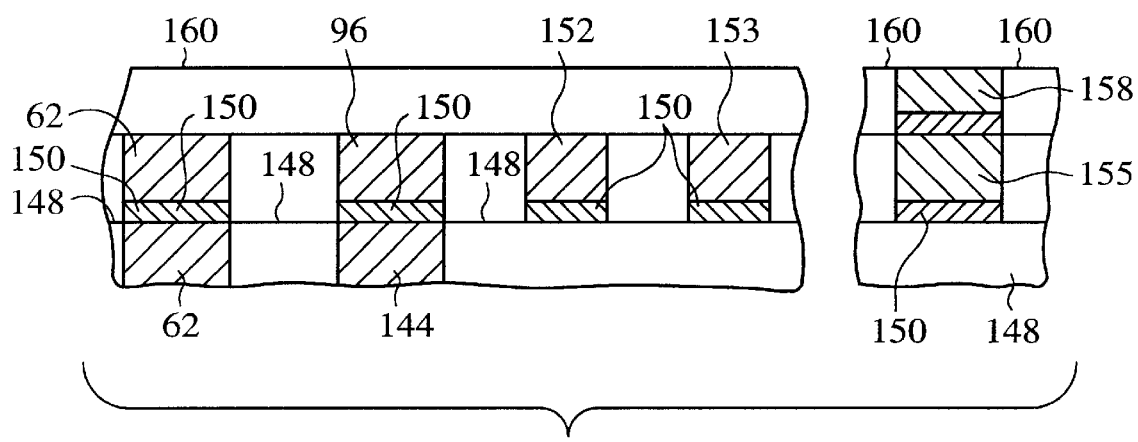
FIG. 11. is a cross-sectional view showing steps in the formation of magnetic stud and conductive coil sections subsequent to those shown in FIG. 9.

In FIG. 11 similar process steps are employed to form a first coil layer atop the alumina layer 148 and center tap stud 144, and to extend the magnetic return stud 62. To form the coil layer and in other situations for which the formation of high quality magnetic material is not necessary, a process termed "through plating" is typically employed rather than window frame plating. The process of through plating differs from window frame plating primarily by exposing via a photoresist mask and electroplating only those areas in which permanent elements are to remain, whereas window frame plating also exposes and plates additional areas, which later need to be removed.

A seed layer 150 of NiFe or MoNiFe is deposited and then coated with a photoresist layer, not shown, which is photolithographically patterned and selectively removed in areas to allow Cu electroplating of the coil section 96, which is atop the center tap stud 144, along with coil sections 152, 153, 155 and an array of other coils sections, not shown in this figure. After Cu electroplating, the layer of photoresist that had allowed exposure of the coil sections 96, 152, 153 and 155 is removed and another photoresist layer is deposited and selectively developed to leave exposed a portion of the seed layer 150 above the magnetic stud 62. Another layer of the magnetic stud 62 is then formed by window frame plating of permalloy on the exposed (Mo)NiFe seed layer 150. Another layer of photoresist is then formed, leaving an area above the coil section 155 exposed for plating. A copper interconnect stud 158 is then electroplated on the top of section 155 to provide an electrical connection between the coil layer shown in FIGS. 10 and 11 and the second coil section, not shown in these figures. After the photoresist has been removed, the seed layer 150 exposed between the magnetic studs 61 and 62 and the various coil sections including sections 96, 152, 153 and 155 is removed by IBE or similar process to electrically disconnect the various studs and sections. Another layer of alumina 160 is then sputter deposited and lapped to form a flat surface exposing interconnect stud 158 and magnetic studs 61 and 62, the surface then being cleaned to prepare for the formation of another similar coil layer along with another extension to magnetic studs 61 and 62. The wafer may optionally be heated for a few hours at a few hundred degrees C° at about this point in the process, and additionally at later processing stages, to expel moisture or other contaminants from the layers.

The formation of the second and third layers of coil spirals and magnetic stud extensions proceeds along similar lines as that explained above with regard to the first coil layer, the detailed description of which is omitted for brevity. It should be noted that an array of approximately ten thousand transducers are formed simultaneously on a six inch diameter wafer, and in each of the layers of coil spirals a few positions of this array are devoted to test structures rather than working transducers.

Figure 12:
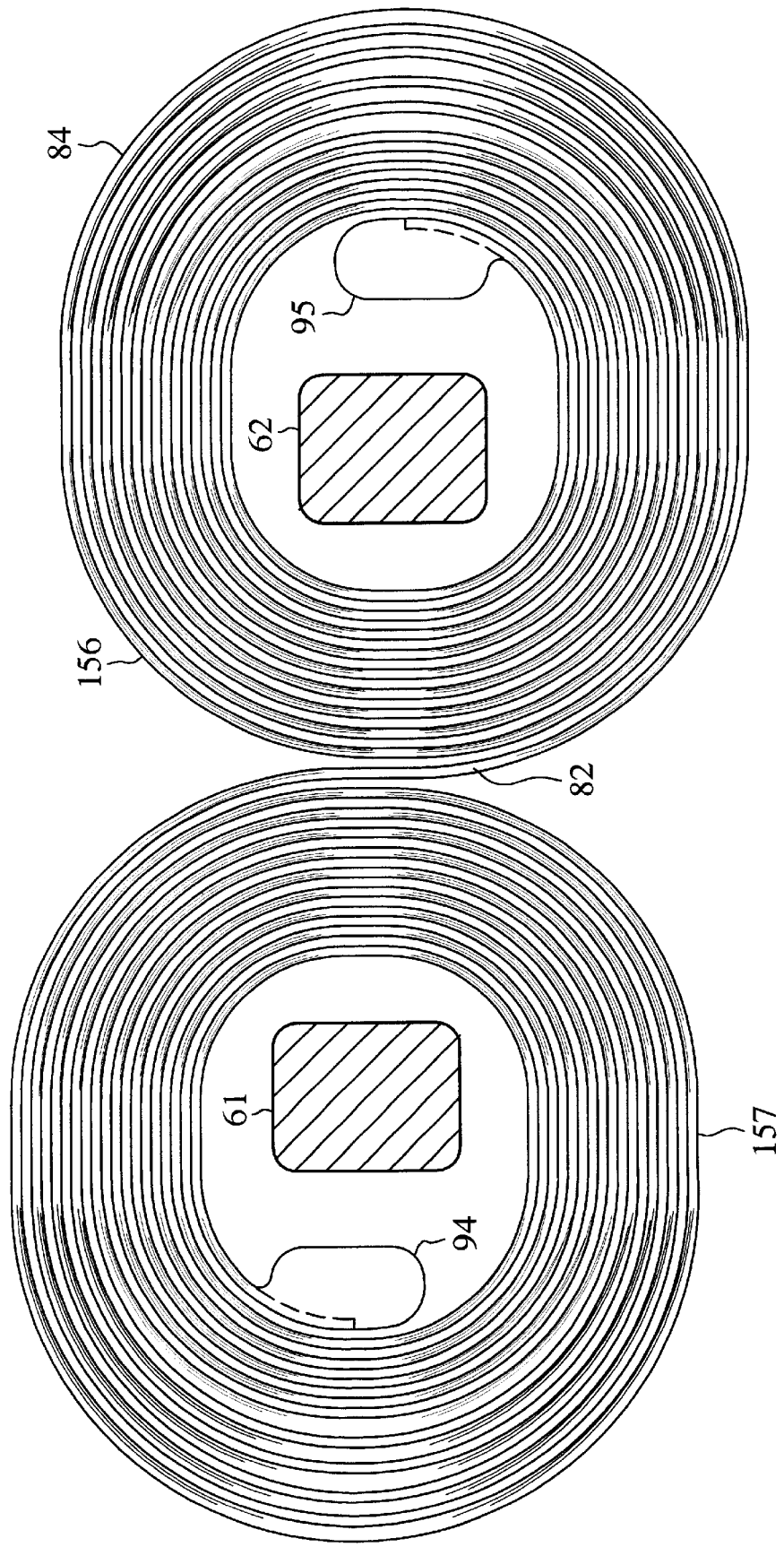
FIG. 12 shows an opened up top view of one of the coil layers formed by the process of FIG. 10.

In FIG. 12, a top view of the third layer of coil 84 shows that these coil sections are part of a coil spiral 156 that winds repeatedly around the magnetic return stud 62, while another coil spiral 157 winds in an opposite direction around magnetic stud 61, the spirals 156 and 157 connected at a crossover 82. As mentioned previously with reference to FIG. 3, these spirals are connected at sections 94 and 95 to the second layer of coil spirals, which are connected to the first layer of coil spirals, which are connected via interconnect studs 133 and gold buttons 120 to provide electrical contact with the drive system.

Figure 13:
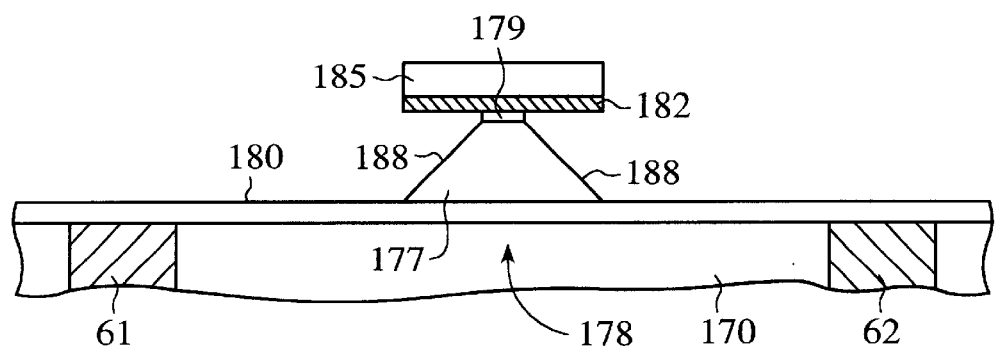
FIG. 13 is a cross-sectional view of the formation of an amagnetic pedestal on a layer between ends of the magnetic studs formed by the process of FIG. 10.

Between the third layer of coil spirals and the bottom yoke an electrical isolation layer 170 shown in FIG. 13 is formed of a layer of alumina. Note that extensions for the magnetic studs 61 and 62 are first formed, by the seeding, photolithography and electroplating process described earlier. Similarly, a pair of copper test leads are formed at this level and lead away from the coils to provide connections for a probe, not shown, to test the transducer. After formation of the studs 61 and 62, the leads and the alumina layer 170, lapping and cleaning are performed so that the layer has an approximately 5 μm thickness and a smooth, clean surface.

In FIG. 13, atop the smooth surfaced isolation layer 170, a pedestal 178 is formed in order to elevate a portion of the magnetic core, including the poletips 44. The pedestal 178 may be formed by a variety of methods of which a preferred example involving chemical etching will now be described. A silicon carbide (SiC) etch stop layer 180 having a thickness of about 4000 Å is first sputter deposited on the wafer in order to protect the alumina layer 170 during etching to form the pedestal 178, which is also formed of alumina. A layer of alumina 177 which is to form the pedestal 178 having a thickness of about 12 μm is then sputtered, atop of which a stressed, high bias layer 179 of alumina about 0.5 μm thick is optionally formed, which etches faster than the thick alumina layer 177. This etching is performed by first depositing a metal etch mask of MoNiFe to a thickness of about 500 Å, on top of which a layer of photoresist 185 is applied and patterned. Exposed areas of the MoNiFe are then removed and the resist is hardbaked for rigidity, leaving a rectangular area 182 protecting the top of the pedestal, a small side of this area 182 being shown in this cross-sectional view. The 12 μm thick layer of alumina is then chemically etched with a solution of HF diluted to 15% by volume, although other chemical etchants may be alternatively employed, until the SiC layer 180 is exposed. Nearly completed etching of the pedestal 178 is shown in FIG. 13, which will result in a peaked pedestal having sides 188 that slope at an angle of 40° to 60° and are symmetrically disposed between the studs 61 and 62. The angle of the pedestal sides 188 is important in controlling the magnetic separation and area of the bottom yoke adjacent to the poletips 44, which is important in optimizing the magnetic performance. Control of pedestal side 188 slope is important for achieving a desired thickness and stress of the plated NiFe bottom yoke for magnetic stability. The photoresist 185 and metal mask 182 fall from the pedestal and are removed once the bias layer 179 has completely disintegrated. A reactive ion etch (RIE) preferably utilizing a $CF_4/O_2$ plasma is then employed to remove the SiC etch stop layer 180, except for a portion of that layer disposed beneath the pedestal 178.

Figure 14:
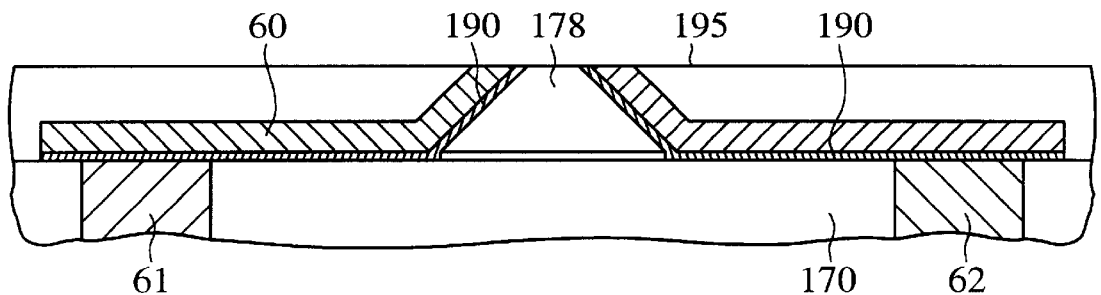
FIG. 14 is a cross-sectional view showing the construction of a magnetic yoke on the layer and pedestal of FIG. 14, the yoke having ends extending transversely toward each other.

Referring now to FIG. 14, atop the studs 61 and 62, the alumina isolation layer 170 and the pedestal 178, a seed layer 190 of (Mo)NiFe is deposited to a thickness of about 1000 Å. A photoresist layer, not shown, is then patterned to leave exposed the seed layer 190 in the desired shape of the bottom yoke 60 (see FIG. 4), outlined by a "window frame" of photoresist with additional areas of the seed layer covered for the later formation of copper studs. An approximately 3 μm thick layer of permalloy is then electroplated atop the seed layer 190 to form the bottom yoke 60, blanketing the peaked pedestal 178, after which the photoresist is stripped from the wafer. The thickness of the bottom yoke 60 is important to the saturation and overwrite performance of the transducer, as the yoke 60 is designed to saturate at a flux level slightly below that which would cause the poletips 44 to saturate, keeping the poletips from saturating and therefore keeping the magnetic field at the poletips from broadening. Another layer of photoresist is now deposited and patterned to leave exposed areas of the seed layer 190 for forming copper studs having a thickness of about 14 μm, not shown, that are connected to the copper test leads which are in turn connected to the coil 84, to allow wafer level testing of inductance and resistance of the coil. The photoresist is then removed, followed by IBE removal of the seed layer that is not covered by the yoke 60 or test studs, and then a wet etch removal of the permalloy left in the "field" outside the window frame, after which the yoke and studs are again covered with photoresist, which is thereafter stripped. The wafer surface is then coated with a layer of alumina 195 that is thick enough (at least about 15 μm) to be nowhere lower than any of the protruding elements such as the pedestal 178 or copper test studs. The wafer is then lapped sufficiently to separate the yoke 60 by exposing the pedestal 178, obtaining the form shown in FIG. 14. The size of the yoke 60 separation is carefully controlled to be approximately 3 μm in this embodiment, as a smaller separation can lead to magnetic flux crossing between the yoke 60 rather than the gap 46, while a larger separation can constrict the flow of flux between the yoke and the poletips 44.

Figure 15:
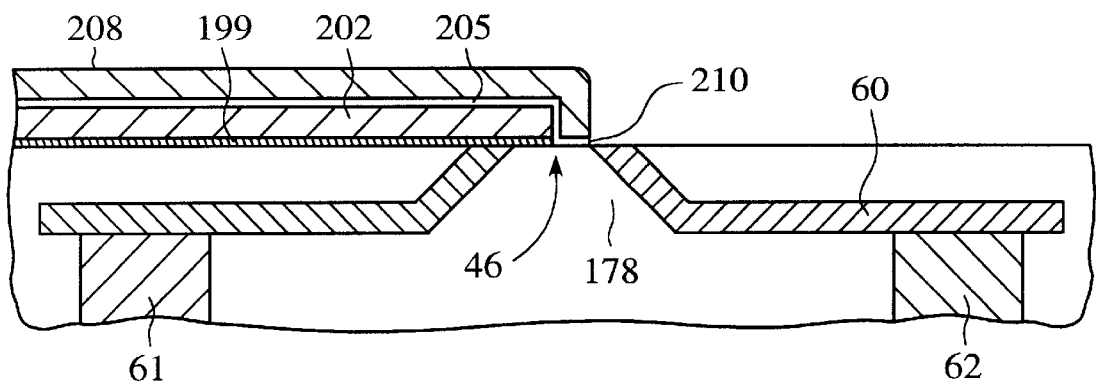
FIG. 15 is a cross-sectional view showing the formation of a first magnetic pole layer and amagnetic gap structure on the extending yoke ends of FIG. 14.
Figure 16:
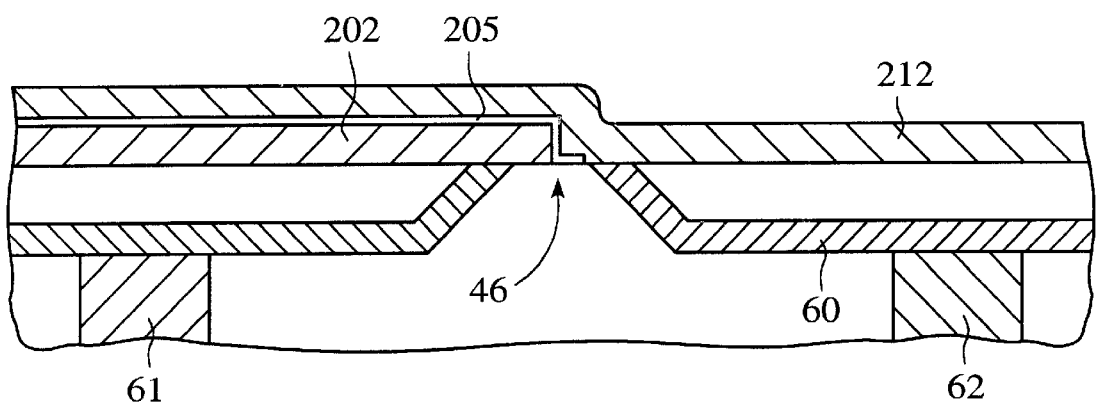
FIG. 16 is a cross-sectional view showing the formation of a second magnetic pole layer adjoining the amagnetic gap of FIG. 15.

In FIG. 15 the formation of the poletips 44 atop the yoke 60 and pedestal 178 begins with the deposit of a seed layer 199 of NiFe, which is then masked, plated and etched by window frame plating to form a first pole layer 202 of permalloy or other magnetic material. A layer 205 of amagnetic material such as hydrogenated carbon ($HC_x$), SiC or Si is then deposited, which will become the amagnetic gap 46 between the poles 44. Although the layer 205 of amagnetic material that forms the gap 46 is formed on an essentially vertical side of the pole layer 202 that is at least several microns in height, a uniform thickness of amagnetic layer 205 is formed on the side of layer 202 adjoining the gap 46 by sputtering in a vacuum chamber while positioning the platform holding the wafer on which the transducers are being formed such that the sputtered material impinges the gap side of the pole layer 202 as well as the top of that layer. This uniform formation on a vertical edge can be accomplished by rotating or transporting the wafer across the base of the sputtering chamber, or simply by positioning the wafer at a location at which the sputtering material has an angled approach. To avoid recession of the pole 44 material relative to the gap 46 during operation and, conversely, to avoid excessive wear of the gap 46 relative to the poles 44, it is desirable that the gap 46 material have a hardness similar to or slightly less than that of the poles 44. For this reason Si is a preferred material for layer 205. The layer 205 is then masked with a photoresist layer 208 that has been patterned so that etching with IBE along mask edge 210 leaves the gap 46 above the pedestal, but removes the portion of the silicon layer that had been covering a portion of the yoke 60. The dimensions of the gap 46 will set the magnetic resolution during communication between the transducer and the disk, the width of the gap 46 being uniform and typically between about 0.05 μm and 0.4 μm, and preferably about 0.26 μm currently. In FIG. 16 the patterned photoresist layer 208 has been removed and a second pole layer 212 has been formed by window frame plating or sheet plating adjoining the gap 46 and atop silicon layer 205. The silicon layer 205 and the portion of the second pole layer that was plated on top of the first pole layer 202 are then removed by lapping to leave a planar surface composed of the first and second pole layers 202 and 212 and the gap 46.

Figure 17:
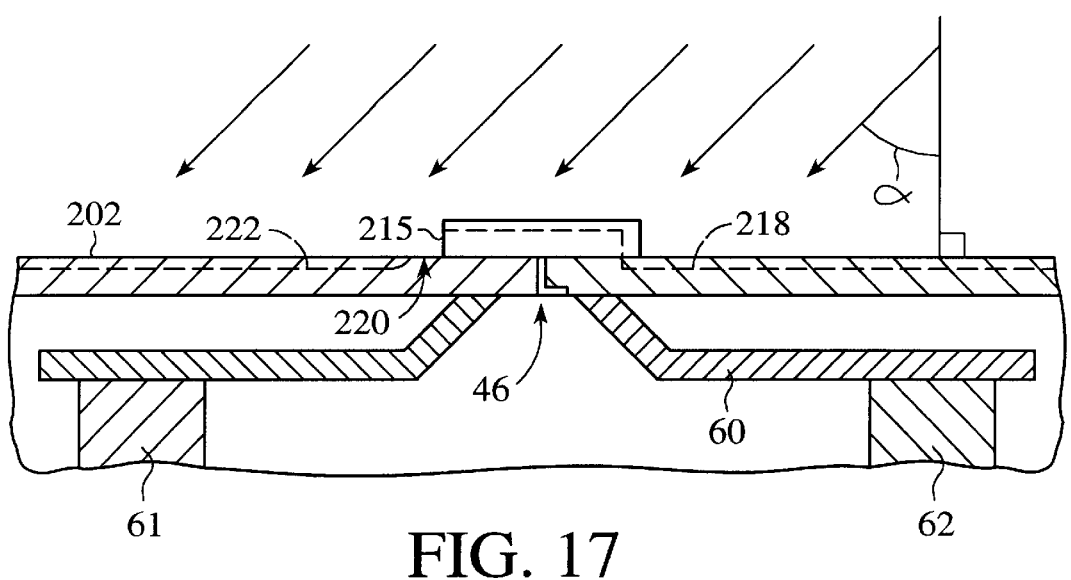
FIG. 17 is a cross-sectional view showing angled, rotating ion beam etching of the pole layers to form tapered poletips.
Figure 18:
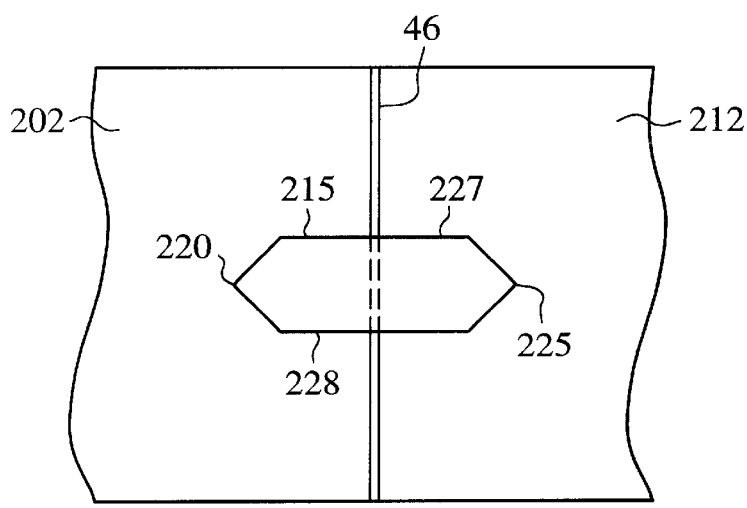
FIG. 18 shows a top view of the pole layers and etch mask of FIG. 17.

Referring now to FIG. 17, a photoresist mask 215, shown also in a top view in FIG. 18, has been formed in the elongated hexagonal shape desired for the poletips 44 and gap 46, however, the mask 215 is larger than the eventual poletip area, to compensate for removal of a portion of the mask during etching. The etching is done by IBE with the ion beam directed at a preselected angle a to the surface of the pole layers 202 and 212, while the wafer is rotated, in order to form vertical sides of the poletips 44, aside from a tapered skirt 213, shown in FIG. 19, of the poletips 44, the skirt 213 acting as an aid to the subsequent formation of the hard wear material 52 that will surround the poletips. The vertical sides of the poletips 44 allows operational wear of the poletips to occur without changing the magnetic read write characteristics of the head. On the other hand, the skirt 213 allows the wear material 52 that wraps around the poletips 44 to be formed without cracks or gaps which can occur, for example, in depositing DLC, preferably by plasma enhanced chemical vapor deposition (PECVD) onto a vertically etched pair of poletips 44. Although this tapered skirt 213 can be achieved by a variety of techniques, an angled, rotating IBE is preferred to exactingly tailor the vertical poletips 44 with tapered skirts 213.

The photoresist mask 215 has an etch rate that is similar to that of the NiFe poletips 202 and 212, so that when the angle a is approximately 45° the pole layer 212 and the mask 215 are etched a similar amount, as shown by dashed line 218. Pole layer 202, however, is partially shielded from the angled IBE by the mask 215, so that a portion 220 of layer 202 that is adjacent to the mask is not etched, while another portion is etched as shown by dashed line 222. As the wafer substrate is rotated, not shown, pole layer 212 will have a non-etched portion 225 adjacent to an opposite end of the elongated mask 215, as will areas 227 and 228 adjacent sides of the elongated mask. Since areas 227 and 228 are adjacent larger widths of the mask 215 than areas such as 220 and 225 and are thus more shielded and etch slower, the rotation of the wafer is preferably slower during periods when the IBE is angled along the elongated length of the mask (closest either to portion 220 or 225). The angle a may be changed to further control the shaping of the poletips 44, for example to employ a greater angle such as about 60° toward the end of the IBE. This rotating, angled IBE is continued for an appropriate time to create a pair of poletips 44 having vertical sides with a tapered skirt 213 and a flat, elongated hexagonal top centered about the gap 46.

Figure 19:
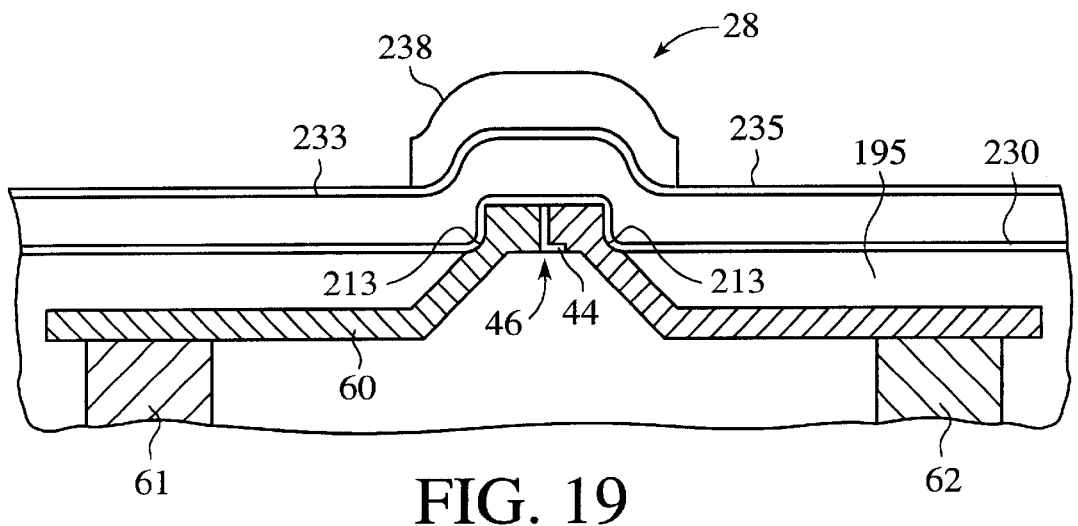
FIG. 19 is a cross-sectional view showing the formation of a hard protective layer on the tapered poletips.

After electrical testing, the wafer carrying the transducer is ready for the formation of the support pads 28, 38 and 40, as shown in FIG. 19, which focuses on the MAP 28 for clarity. An adhesion layer 230 of Si is deposited to a thickness of about 500 Å atop the poletips 44 and alumina layer 195. A layer 233 of DLC is then sputtered onto the adhesion layer 230. An approximately 1500 Å thick layer 235 of NiFe is then deposited, which is then patterned by IBE with a lithographically defined photoresist mask 238 to leave, after IBE, a NiFe mask disposed over the DLC covered poletips 44 and over portions of the DLC layer at positions corresponding to the MIPS 38 and 40, not shown in this figure. The DLC layer 233 covered with the NiFe masks is then reactive ion etched with 02 plasma to leave projections of DLC that form the MAP 28 and MIPS 38 and 40. The MAP 28 and MIPS 38 and 40 are then lapped to expose the poletips 44. The MAP 28 and MIPS 38 and 40 are next protected with a photoresist which extends laterally and longitudinally beyond the edges of each pad, and then an RIE etch using CF4/O2 removes the Si layer 230 not covered by the resist, leaving a flange of Si which helps to position undercutting of the alumina layer 195 further from the MAP and MIPS, resulting in a stronger MAP and MIPS that are thicker closer to the disk-facing surface. The chip 22 is then laser scribed to provide lateral and longitudinal separations from other chips that have been simultaneously formed on the wafer substrate 110. The above described process has produced chips having the ability to write and read at densities approaching one gigabit per square inch, while variations to this basic chip design offer performance improvements.

As mentioned above, several techniques can be employed to increase the tendency of the chip to maintain contact with a disk, even at high speeds. Warping of the chip can be achieved by stressing the first-formed layer or several layers of the chip, so that upon release from the wafer substrate those layers, which are disposed away from the disk, expand, causing the disk-facing surface of the chip to be slightly concave. This concave disk-facing surface tends to form a negative air pressure region between the chip and the disk, holding the chip to the disk. Another means for creating such a negative air pressure region includes etching a recession in the disk-facing surface, preferably in a region spaced apart from the transduction section 48. Similar negative pressure effects can be achieved by tilting the chip so that the edge of the chip which first encounters a given portion of the spinning disk and adjoining air layer is spaced closer to the disk than the downstream edge of the chip. Typically the MIPS 38 and 40 are disposed upstream of the MAP 28, and so such tilting can be effected by tapering the MIPS so that they have an initial wear rate which is greater than that of the MAP, thus shortening the MIPS compared to the MAP. This difference in intial wear rate can be accomplished by forming the MIPS with a smaller area of DLC layer 233 than layer 195, for example. After the initial thinner portion of the MIPS has been worn away, either by lapping or by employment in a drive, the MIPS are designed to have a vertical wear rate equal to that of the MAP, maintaining the desired tilt of the chip. Similarly, one of the MIPS 38 or 40 which is to be positioned during operation further from the center of a disk than the other MIP, can be designed to have a tapered shape resulting in a faster initial wear rate so that when the chip is disposed near a rapidly spinning outer radius of the disk, a skew of the chip relative to the airflow causes the upstream corner of the chip to be tilted closer to the disk, holding the chip to the disk. This technique is especially useful in larger form factor disk drives, where the tendency to fly at an outer diameter of the disk is greater.

Figure 20:
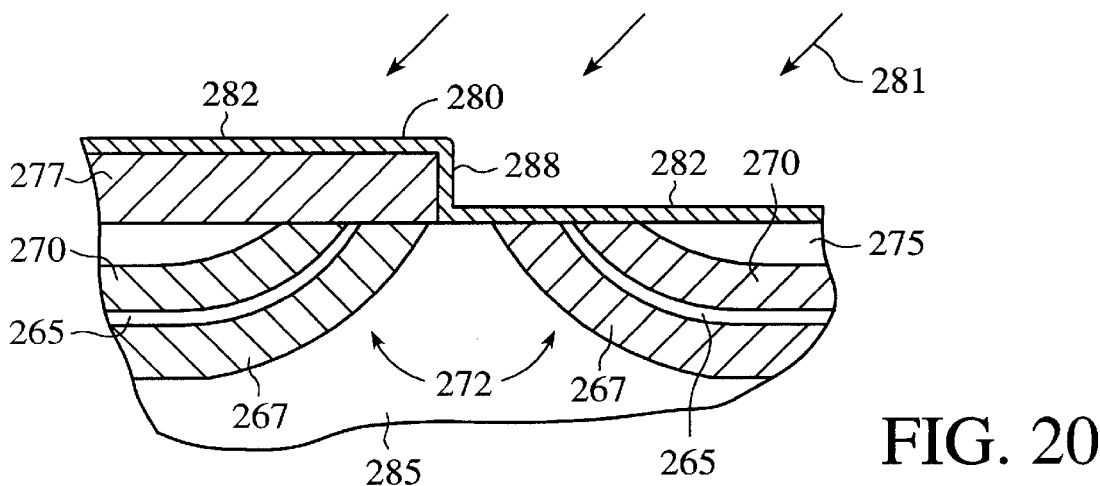
FIG. 20 is a cross-sectional view showing the formation of a layer of high magnetic saturation material on the pole layer adjoining the gap.

Means for performance improvement include increasing the permeance of the magnetic core, which may be accomplished by laminating the yokes, as shown in FIG. 20, including forming a thin amagnetic layer 265 between the formation of first and second magnetic layers 267 and 270, respectively, to construct a laminated bottom yoke 272. Lamination of the magnetic core is believed to increase the magnetic flux-carrying capability of the core, particularly at high frequencies, by increasing the proportion of the core which carries magnetic flux. With changing magnetic fields, electrical eddy currents can occur in a skin layer of the conductive magnetic core material that in turn create magnetic fields in the core inward of the skin layer that counteract the desired magnetic fields. Division of the core into strips, layers or filaments increases the proportion of flux-carrying skin layer as compared to nullified inner core, increasing the overall permeance of the core. Division of the core to smaller sizes than necessary to remove the nullified inner core can, however, reduce the overall flux-carrying capability of the core, as amagnetic spacer material begin to replace the flux carrying skin layer. An optimum thickness of the skin layer depends upon factors such as the conductivity and permeability of the core material, and is generally inversely proportional to the square root of the frequency, which may be on the order of 50 MHz, so that an optimum skin layer for the core of the preferred embodiment is on the order of 1 $\mu$m.

Another way to improve performance, particularly during writing, involves employing a high magnetic saturation ($B_s$) material such as cobalt zirconium niobium or FeAl(N) for a layer of the poletips 44 adjoining the gap 46, thus ensuring a high intensity magnetic flux adjacent to the gap for increased magnetic field gradients and high resolution writing. A high magnetic saturation ($B_s$) or high moment material is generally defined, for the purpose of this application, as one that does not saturate at field strengths greater than 10,000 Gauss. One means for constructing a high $B_s$ layer along a side of a poletip adjoining the gap is shown beginning in FIG. 20. After depositing and planarizing an alumina layer 275, a first pole section 277 of permalloy or other conventional magnetic material is formed by window frame plating, on the top and side of which is formed an approximately 1000 Å thick layer of a high moment material 280 (from the group mentioned above or other high $B_s$ materials) by sputtering at an angle, as shown by arrows 281. A vertically directed IBE (normal to the wafer surface) is then performed to remove the essentially horizontal sections 282 of layer 280 disposed atop alumina layer 275 and pedestal 285, while most of an essentially vertical layer 288 of high $B_s$ remains after the IBE.

Figure 21:
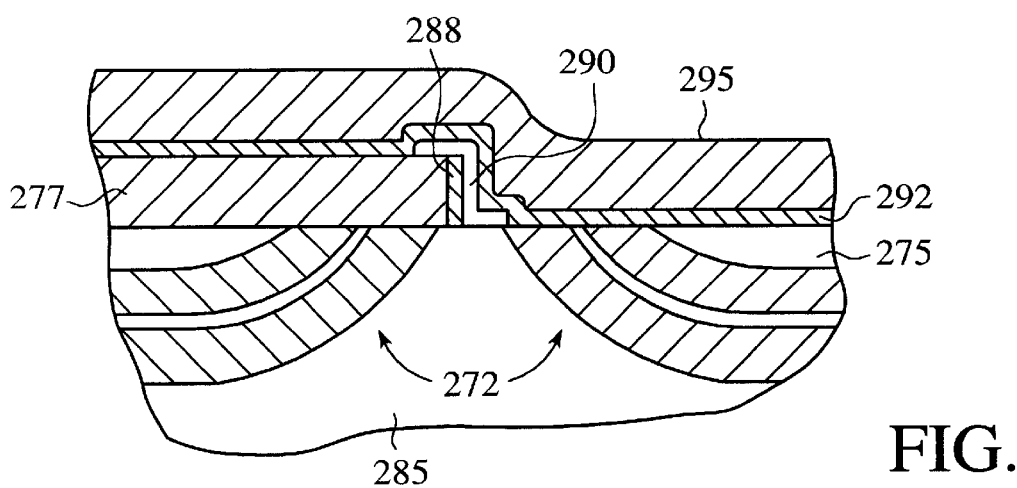
FIG. 21 is a cross-sectional view showing the formation of layers of high magnetic saturation material on both sides of the gap.

In FIG. 21 an amagnetic gap 290 has been formed adjoining the film 288 of high $B_s$ material 288 by the method described above, after which another layer 292 of high $B_s$ material is sputtered at an angle to cover a side of the gap 290 as well as the top of the first pole section 277 and alumina layer 275. This high $B_s$ layer 292 also serves as an electroplating layer for a second magnetic pole section 295, which may be formed of permalloy. After planarizing, not shown in this figure, to expose the gap 290, a high moment layer thus adjoins both sides of the gap, providing a much higher saturation field for writing as well as a harder or otherwise more durable structural material that maintains a sharply defined gap despite wear for continued high resolution. Alternatively, since a high moment material is needed for increasing the saturation level of flux adjacent to the gap for writing, and so for writing only needs to be formed adjoining a downstream side of the gap relative to the moving media, only the downstream poletip needs to be coated with the high moment material. This high moment coating may be formed by a similar process as employed to form the gap or the high moment layer 288, which were described above and will be omitted here for brevity.

As mentioned above, another means for increasing the efficiency of the transducer involves laminating some or all of the core, which may be employed in concert with the above described high moment material 280 adjoining the gap 46. This division of the core is accomplished in the present invention by forming each of the magnetic yokes in a pair of layers, the layers each having a thickness of about 1.5 $\mu$m to 2.0 $\mu$m and separated by an approximately 0.1 $\mu$m thick amagnetic (preferably alumina) space, rather than the approximately 3 $\mu$m thickness of solid yokes 55 and 64 described above. Similar division is accomplished with the magnetic studs by forming a group of at least a few separated magnetic areas in each of the layers that are stacked to form the studs, rather than the solid magnetic studs 61 and 62 described above.

Figure 23:
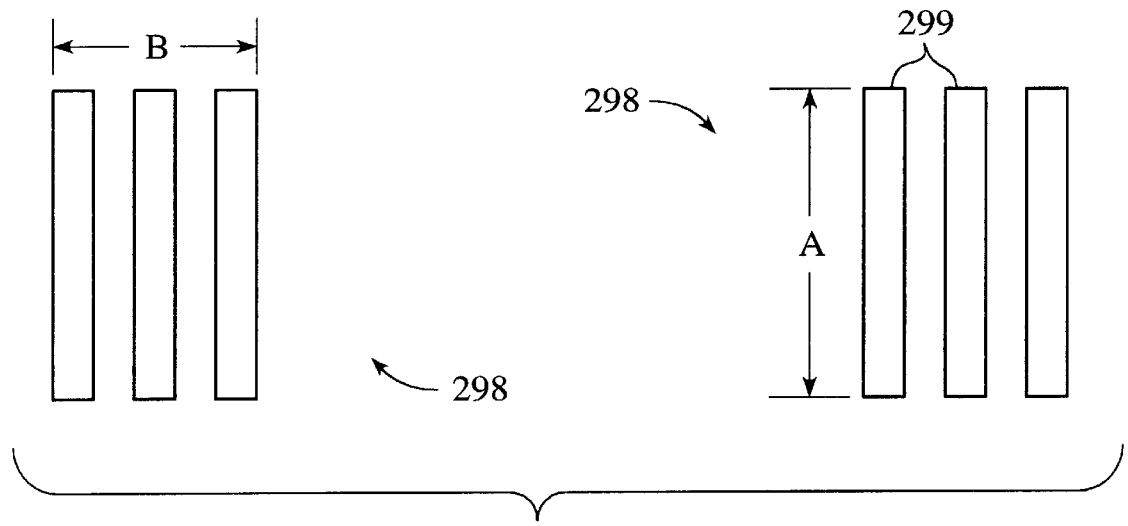
FIG. 23 is a top view showing the formation of an alternative embodiment of laminated magnetic studs.
Figure 22:
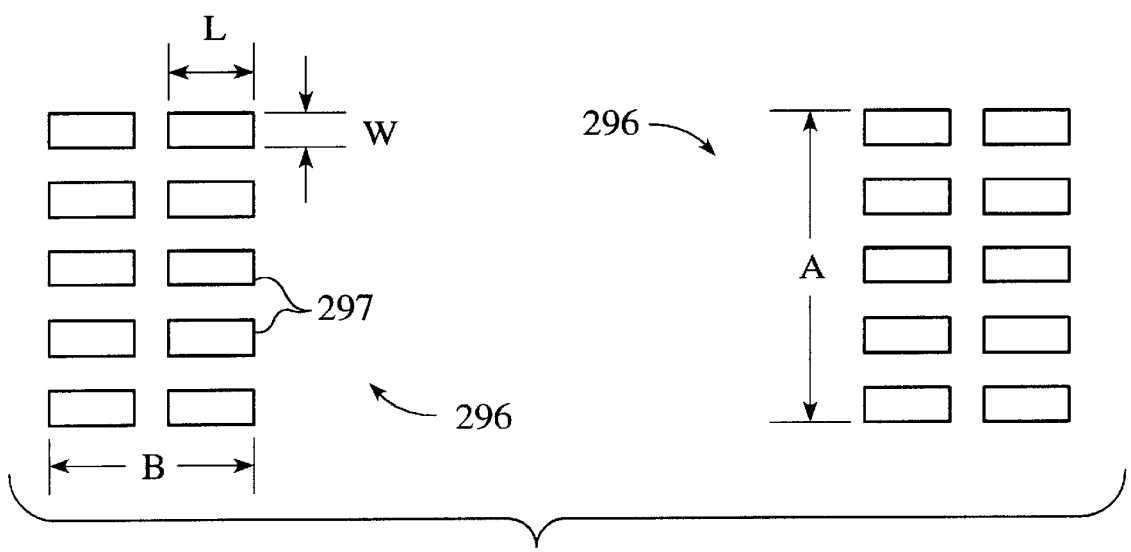
FIG. 22 is a top view showing the formation of a pair of laminated magnetic studs for connecting top and bottom yokes.

A top view of a layer including a pair of laminated studs 296 is shown in FIG. 22 to include a number of magnetic slats 297 each having a width W of about 3 μm and a length L of about 10 μm, the slats being separated by amagnetic material similar in dimensions to the slats, so that the overall width A of each stud 296 is about 31 μm and the overall length B of the studs is about 25 μm. The slats 296 may be formed of permalloy or other magnetic material, and are separated by approximately 3 μm of hardbaked photoresist. A series of generally identical stud layers is stacked to form the pair of complete studs that connect the laminated yokes or, as discussed below, a single laminated stud layer may connect the yokes. FIG. 23 shows an alternative construction of a layer of magnetic studs 298 utilizing strips 299 of magnetic material separated by hardbaked, amagnetic photoresist spacers. The overall dimensions A and B of each stud 298 in the layer are approximately 31 μm and 20 μm, respectively. Each strip 299 has a length of about 31 μm and a width of about 4 μm, and is separated from an adjacent strip 299 by about 4 μm of resist.

Figure 24:
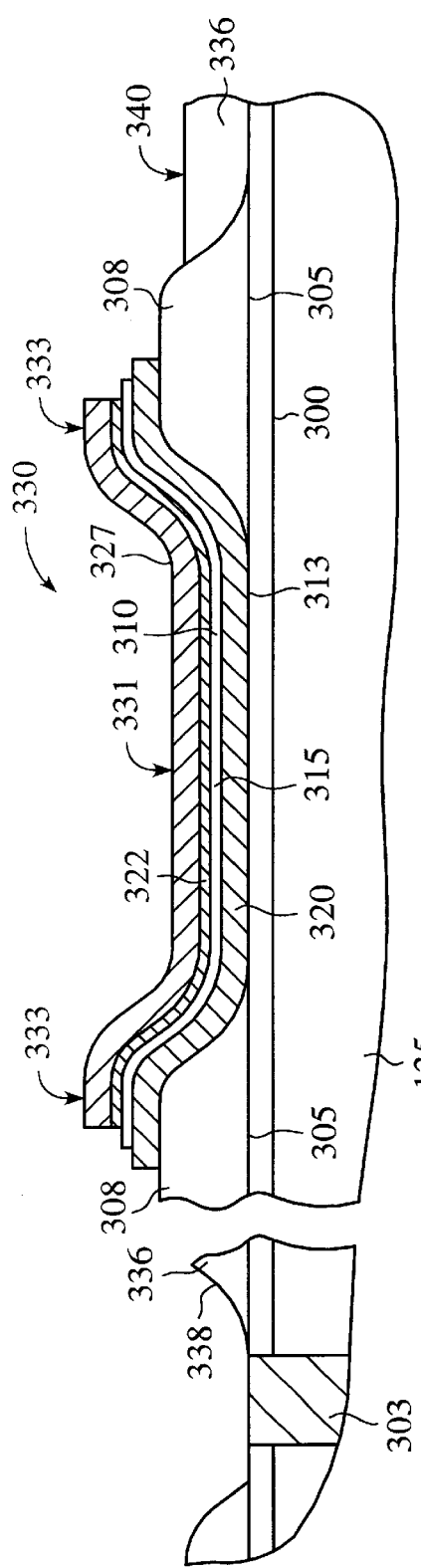
FIG. 24 is a cross-sectional view of the formation of a laminated top yoke.
Figure 25:
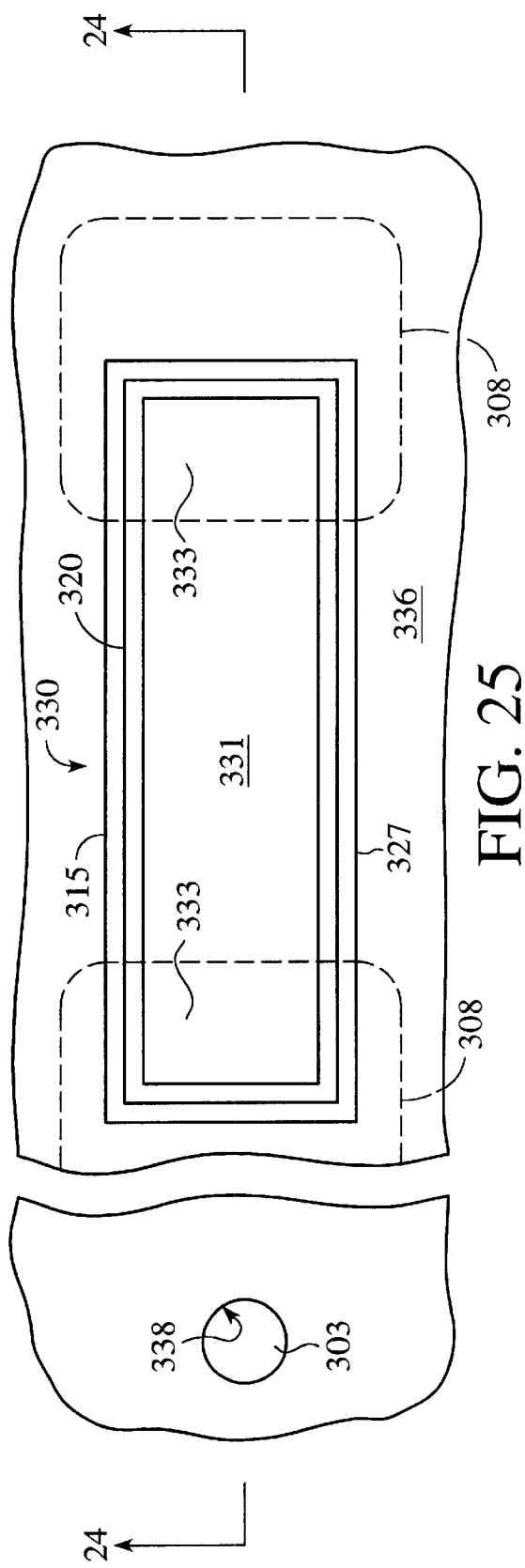
FIG. 25 is a top view of the formation of a laminated top yoke of FIG. 24.

Beginning with FIGS. 24 and 25, the construction of an alternative and preferred embodiment of the current invention is shown which employs a curved, clamshell shaped magnetic core having shorter magnetic studs formed by a single stud layer, the space needed for the several layers of inner coils being provided instead by curving of the top and bottom yokes. The construction of this embodiment of the transducer proceeds essentially as described before except for the formation of the clamshell shaped core, which begins with the formation, atop the alumina isolation layer 135, of an etch stop layer 300 of SiC. The etch stop 300 is pierced by an interconnect stud 303, and has an alumina layer 305 formed thereon. The insulative, amagnetic layer 305 is masked with a photoresist patterned to expose areas at which the core and coils are to be formed, so that after essentially isotropic etching with dilute HF (similar to that employed to create the pedestal beneath the poles) a pair of plateaus 308 having sloping sides remains above the etch stop layer 300, separated by a recessed area 310 at which the etch stop layer 300 is exposed. The plateaus 308 and exposed portions of etch stop layer 300 (many thousand such plateaus 308 may be arrayed on a single wafer) are then sputtered with MoNiFe to form a first electroplating seed layer 313 about 1000 Å to 1500 Å thick. A first magnetic layer 315 of yoke 303 is then formed by sheet electroplating to a thickness of between 1 μm and 2 μm, and is then defined by ion beam milling. A thin (about 1000 Å thick) amagnetic layer 320 of alumina is then deposited, and a second MoNiFe seed layer 322 is then sputtered, after which a second magnetic layer 327 is formed by sheet electroplating and ion beam milling to be positioned atop amagnetic layer 307 and to have an area slightly less than that of first magnetic layer 315. The result is a yoke 330 having a flat, recessed middle surface 331 between a pair of raised, flat end surfaces 333.

In order to provide a planar, insulative surface for the formation of the first coil layer, a first photoresist layer 336 is then deposited to a thickness equal to the height of the recessed surface 331 above the etch stop layer 300 (approximately 4 μm), and patterned to remove those portions of the resist overlaying the yoke 330 and most of the plateaus 308. A via 338 is also formed in the first resist layer 366 for later connection of the interconnect stud 303 with the first coil layer. The wafer is then heated first to about 100° C. to remove impurities, and then gradually raised in temperature, which causes the remaining photoresist to melt and flow into small spaces left by the patterning and causes sides of the via to slope. After baking at approximately 250° C. for a period of about 5 hours, gradual cooling hardens the photoresist, resulting in a hardbaked condition that offers a hard, insulative layer 336 with a flat surface 331 and 340 for formation of the first coil layer.

Figure 26:
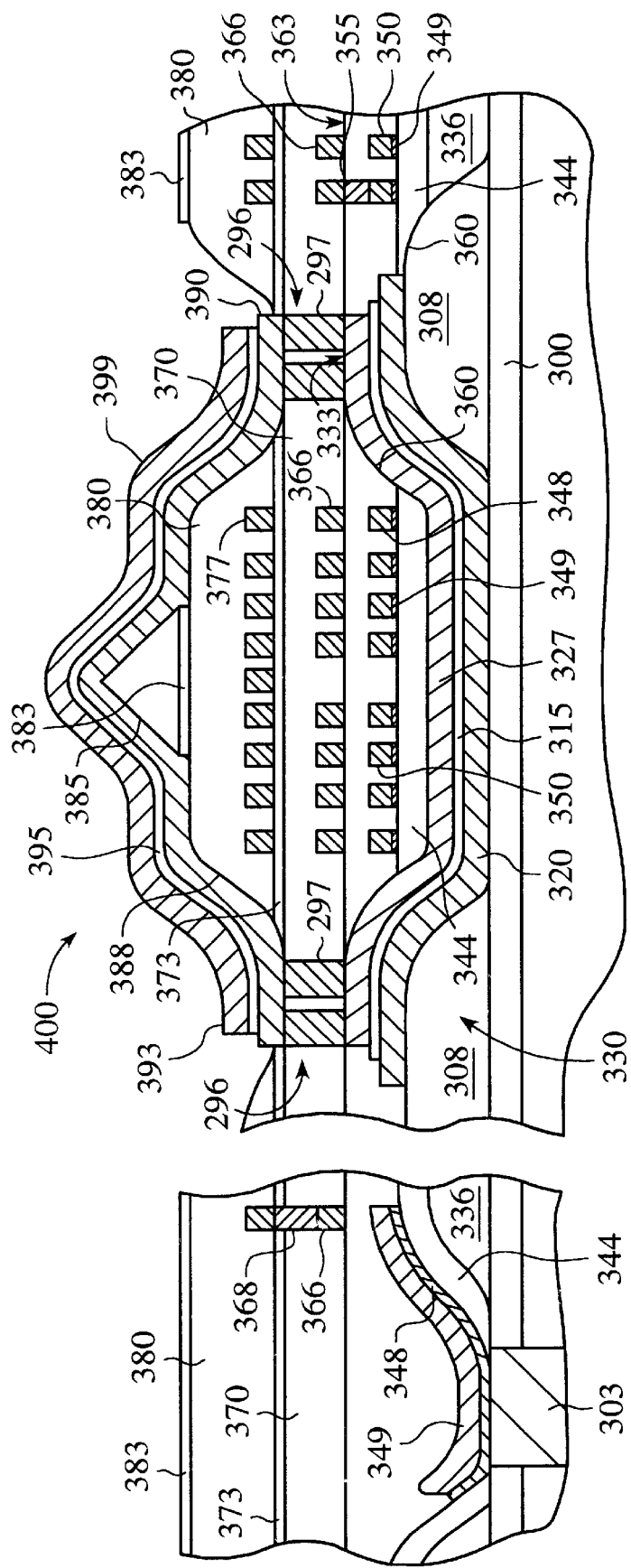
FIG. 26 is a cross-sectional view of a laminated, clamshell shaped magnetic core, including the top yoke of FIG. 24 and the laminated studs of FIG. 22.

Referring now to FIG. 26, a second photoresist layer 344 is deposited at this point to provide insulation between the yoke 303 and a first coil layer, and is then developed to remove portions of that layer 344 over the via 338 and the end surfaces 333. This patterned second resist layer 344 is heated and baked according to a similar process as that described above for the first resist layer 336 to achieve the hardbaked condition. An approximately 500 Å to 1000 Å seed layer 348 of NiFe is then sputtered on the hardbaked resist 344 and interconnect stud 303, after which is formed, by through plating, a first copper coil layer 350 and an interconnect lead 349 that connects that coil layer 350 and the interconnect stud 303. Although only a few windings of the first coil layer 350 are shown in this cross-sectional figure for clarity, coil layer 350 has a similar shape and number of windings as that pictured in FIG. 12 (although coil layer 350 does not cross over). Another via, not shown, is also fashioned at an opposite end of coil layer 350 to provide connection by another interconnect lead, also not shown, for completion of the electrical circuit. A pair of interconnect studs 355 are formed at this point above an inner section of coil layer 350 while the remainder of the coil 350 is covered with photoresist, only one of the studs 355 being shown in this figure.

An alumina layer 360 is then formed on and about the first coil layer 350, the alumina layer and interconnect studs 355 then being lapped and cleaned to provide a planar surface 363 for further processing. A second coil 366 is formed by through plating atop the alumina layer 360 and interconnect studs 355 on a seed layer, not shown. Another interconnect 368 is formed on an outer coil section for electrical connection with the next coil layer. The magnetic strips 297 are then formed by electroplating, to form a single layer of laminated studs 296. An alumina isolation layer 370 is then formed on and about the studs 296 and coil 366, which is then lapped to expose the studs. An etch stop layer 373 of nonconductive SiC is then formed, followed by a third coil layer 377. Portions of the etch stop layer 373 above the studs are removed, and another alumina layer 380 is formed on and about the third coil layer 377, which are then lapped flat. Another etch stop layer 383 is then sputtered, on top of which a pedestal 385 is constructed as previously described. Most of the etch stop layer 383 that is not covered by the pedestal 385 is then removed by IBE. The pedestal 385, any exposed etch stop layer 383 and the exposed alumina layer 380 are then covered with photoresist which is patterned with openings above the studs 396. An isotropic etch is then performed through the above-stud openings which produces sloping sides 388 of alumina layer 380. A first 390 and second 393 magnetic layer are then formed on top of the pedestal 385 and alumina layer 380 by window frame plating, with a thin amagnetic alumina layer 395 formed therebetween. The result is a terraced, laminated bottom yoke 399 and a clamshell shaped, laminated magnetic core 400. The formation of poletips atop the pedestal 385 after lapping to separate the top yoke and the formation of hard material encompassing the poletips proceeds as previously described.

Figure 27:
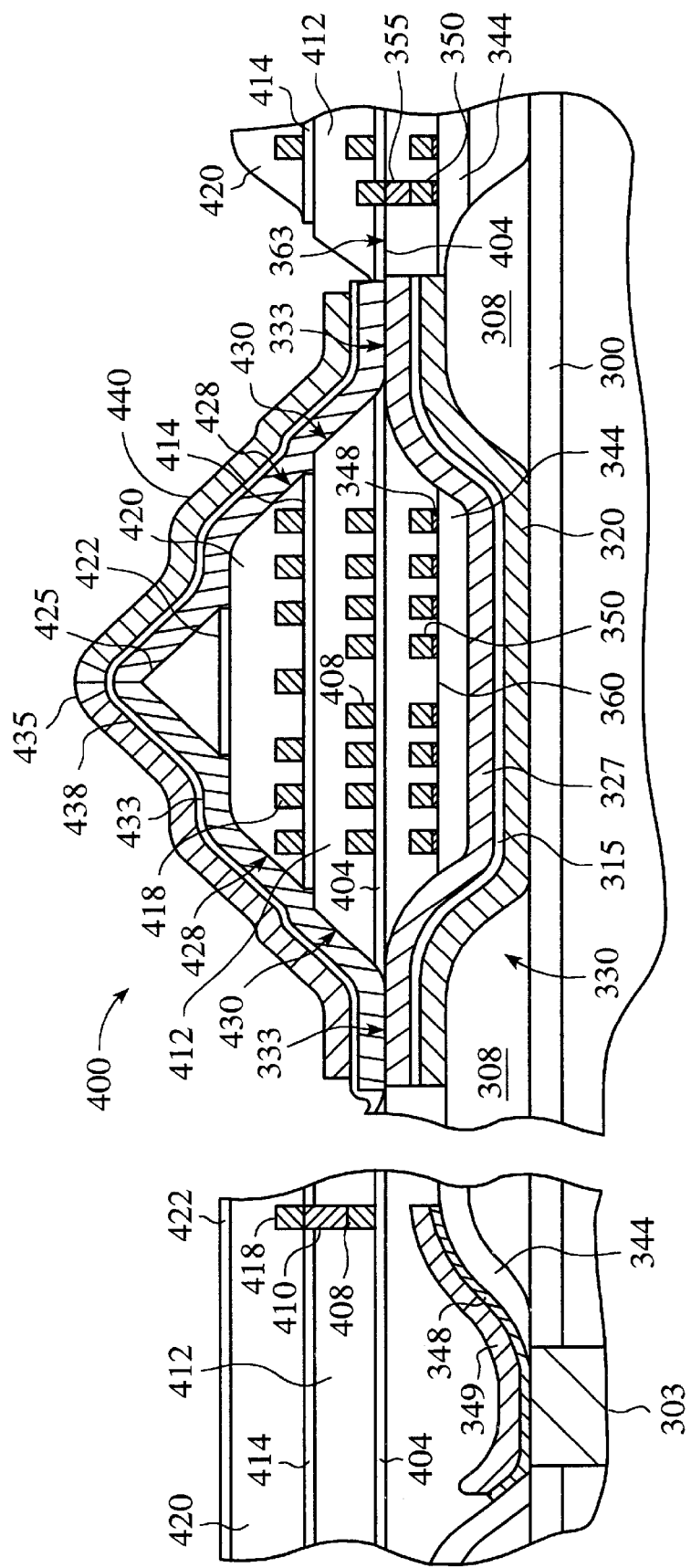
FIG. 27 is a cross-sectional view of a laminated, clamshell shaped magnetic core, including the top yoke of FIG. 24 and without any magnetic studs.

In FIG. 27, another embodiment is shown that utilizes a terraced bottom yoke to obviate the need for magnetic studs. The formation of this embodiment proceeds as described immediately above for the previous embodiment which has a single magnetic stud layer core 400, up to the step of forming a planarized surface 363 atop the top yoke 330, and so the description of this embodiment having a terraced bottom yoke and no magnetic studs will begin at that stage. Atop the planar surface 363 an etch stop layer 404 of SiC is sputtered. A spiraling coil layer 408 is then formed by through plating on top of the etch stop layer 404. At this time portions of the etch stop layer 404 atop the raised end sections of top yoke 330 are removed by IBE, although the etch stop layer may alternatively be left intact. Much as before described, copper interconnects 410 are formed by double plating atop exposed outer sections of coil 408. Another alumina layer 412 is now formed on and about the coil 408 and is lapped flat to expose the interconnect 410. Another etch stop layer 414 is now formed atop the flat alumina layer 412, and another layer of coils 418 is then formed atop that etch stop layer 414 and the interconnect which, as before, has been exposed by IBE. Another layer of alumina 420 is then formed on and around coils 418 and is lapped flat, after which an etch stop layer 422 and pedestal 425 is formed, as previously described.

The etch stop covered alumina layers 418 and 412 are then etched in steps to form the terraced profile of those layers shown in this figure. This is achieved by first removing by IBE that portion of etch stop 422 not covered by the pedestal 425, and then forming a photoresist pattern that has apertures over the raised ends 333 of the top yoke 330, in order to isotropically etch layer 418 to create sloping sides 428, with the etching being stopped by layer 414. Ion beam etching then removes that portion of layer 414 which is not covered by alumina layer 420, so that another photoresist layer can be patterned with apertures over ends 333 allowing isotropic etching of alumina layer 412 to create sloping sides 430. That etching is stopped by SiC layer 404 or, for the situation in which layer 404 has been removed to expose ends 333, the etching is stopped by those ends 333. A pair of magnetic layers 433 and 435 are then formed by window frame plating, with a thin (1000 Å) alumina layer 438 therebetween, in order to create a laminated bottom yoke 440. The wavy ribbon of laminated yoke 440 is now ready for the formation of a magnetic pole structure and wear pad, which proceeds as previously described and so will be omitted here for brevity.

In alternative embodiments, not shown, more or fewer coil layers may be formed, essentially by adding or deleting a step of forming a coil layer atop an etch stop layer. For instance, a transducer having only coil layers 350 and 408 may be formed by simply forming the pedestal 425 atop etch stop 414, instead of forming coil 418 on that layer 414. On the other hand, a transducer having four coil layers can be formed by constructing an additional coil layer on top of etch stop 422, and instead forming pedestal 425 on a later formed etch stop layer. One should also note that in other variations the magnetic core may include a wavy or curved bottom yoke while the top yoke is generally planar, although optionally laminated. Also, a curved bottom yoke may be formed on alumina sides that have been sloped, without the employment of multiple etch stop layers, by isotropic etching of each coil-encasing alumina layer through photoresist apertures disposed over ends of the top yoke, with each successive aperture being smaller than the one through which etching of the previous alumina layer occurred.

Figure 28:
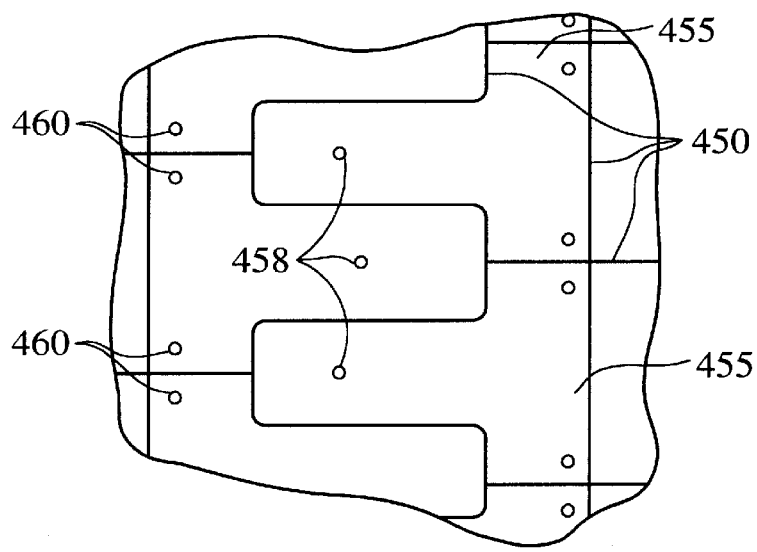
FIG. 28 is a bottom view of a T-shaped chip of the present invention.

As shown in FIG. 28, non-rectangular chip geometries may be formed by scribe lines 450, which form in this figure an array of T-shaped chips 455. The chips 455 each have one MAP 458 and two MIPS 460 disposed in a triangular pattern. After laser scribing is complete, poletips 44 are protected by a photoresist cover while the scribed chips 22 or 455 are exposed to an etchant such as nitric acid (NOH), which selectively dissolves CuRL layer 114 in order to release the formed chips 22 or 455 from the substrate 110.

Figure 29:
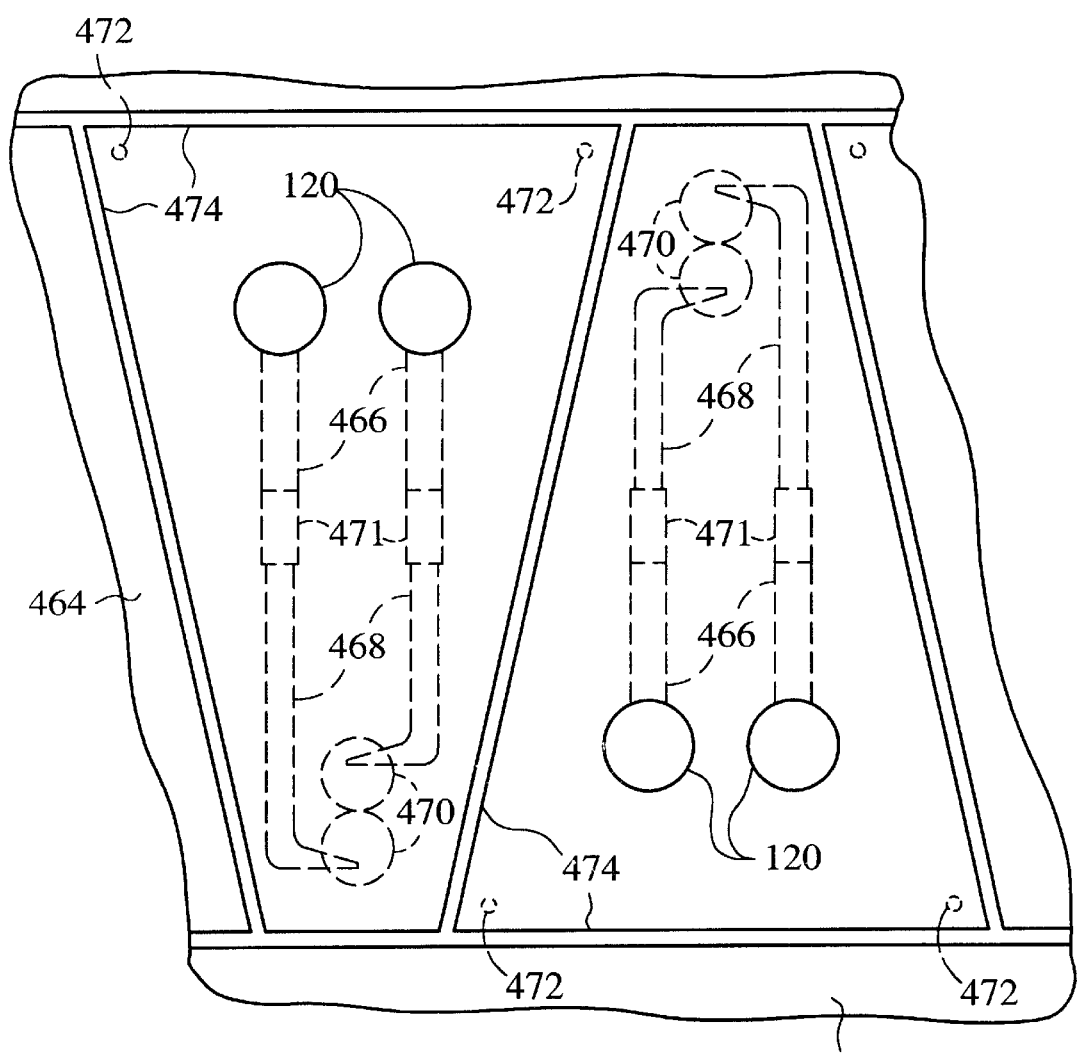
FIG. 29 is a top view of a pair of trapezoidal chips of the present invention.

Other chip geometries that accommodate a stable spacing of the MAP and MIPS are also possible and have advantages including allowing an increased number of chips per wafer and lowering the mass per chip. In particular, a trapezoidal chip 464, two of which are shown in FIG. 29, has proved to offer increased yield, lower mass and improved mechanical and dynamic performance. A side of the chips 464 facing away from the disk is shown to illustrate the gold interconnect buttons 120 and the leads 466 and 468 that connect those buttons with a pair of connected coils 470, so that current can flow through the coils via the buttons. Test pads 471 are positioned to allow connection, via the disk-facing side of the chip before formation of the final disk-facing isolation layer, not shown in this figure, with the coils 470 via leads 468. A pair of chips 464 is shown positioned as they would be on a wafer, which may hold ten thousand or more such chips. MAPs 472 are positioned near lateral extremities of each chip 464, while scribe lines 474 denote places at which the chips will be separated.

Figure 30:
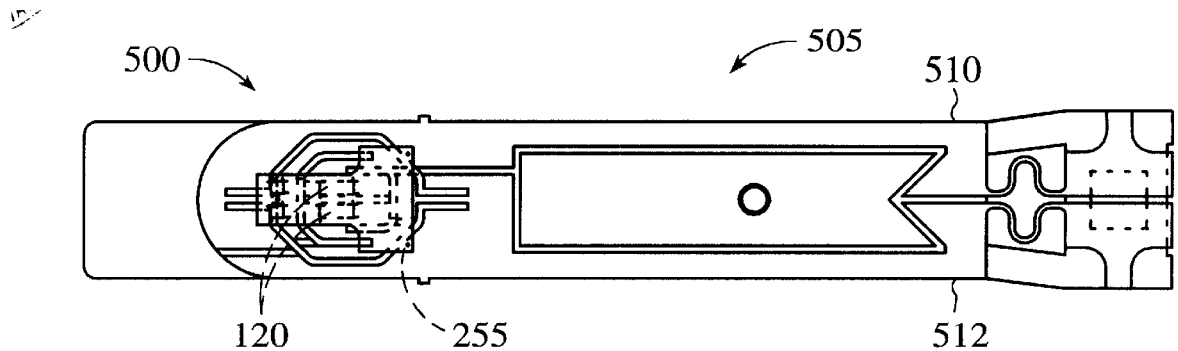
FIG. 30 is bottom view of a flexure beam and gimbal attached to the T-shaped chip of FIG. 28 to from a head gimbal assembly (HGA).

FIG. 30 shows a side of the T-shaped embodiment of the chip 255 that faces away from the disk and is attached to a gimbal structure 500 located near an end of a flexure beam 505. The attachment of the chip 255 to the gimbal 500 is made by soldering, ultrasonic or thermo-compressive bonding of a conductive paste or metal alloy to the trio of gold buttons 120 on the chip. The flexure beam 505 is formed of a conductive material such as a stainless steel sheet that has been etched or micromachined to create separate conductive paths 510 and 512 that connect to the gold buttons 120 via the gimbal 500, in order to provide an electrical circuit for the chip 255 as well as tailored mechanical resilience and compliance. The flexure beam 505 also includes a layer of insulative damping material sandwiched between the conductive paths 510 and 512 and another hard but flexible layer, not shown. Also not shown in this figure is a shock absorbing cross bar that is spaced slightly apart from the beam 505 and that keeps the chip 255 from traveling more than a minute amount from the disk surface even under extreme shocks, transferring most of the energy from a shock away from the chip.

Figure 31:
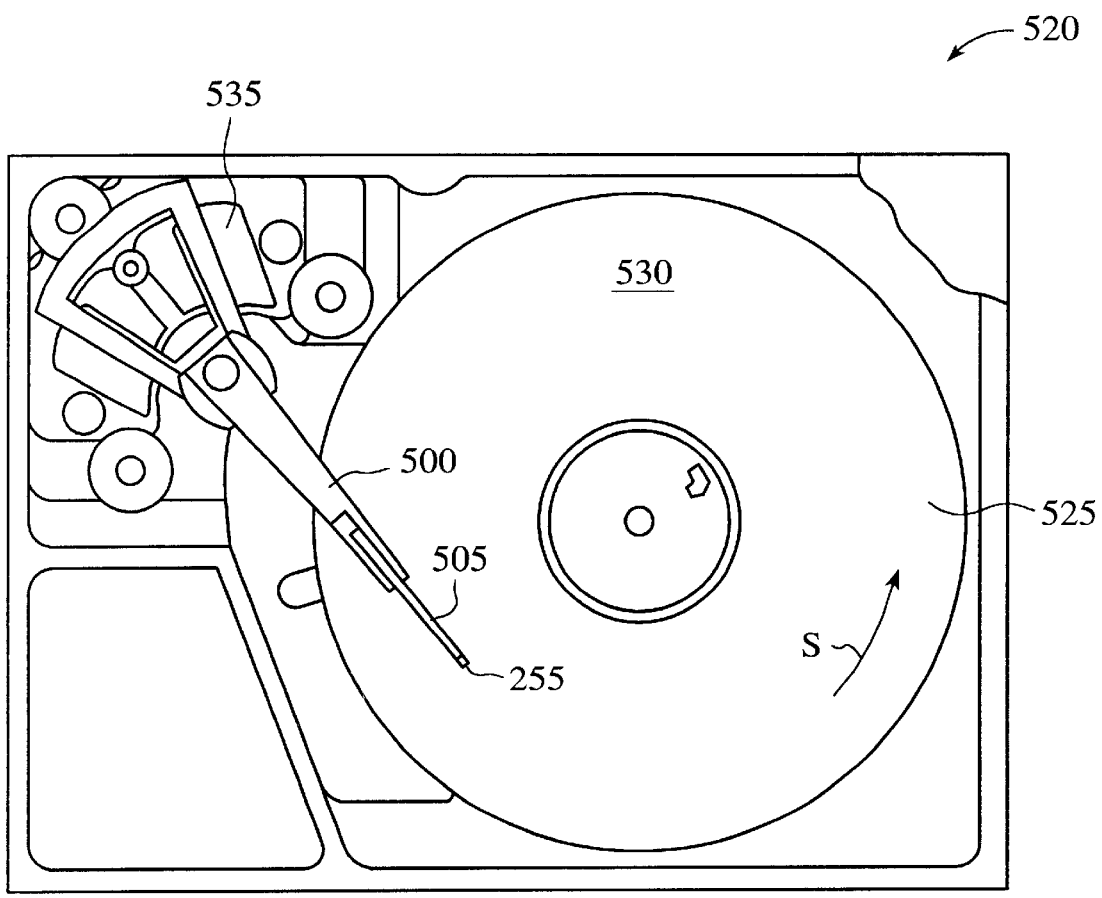
FIG. 31 is an opened up top view of a disk drive employing the HGA of FIG. 30.

FIG. 31 shows a hard disk drive 520 in which the chip 255 operates in substantially continuous sliding contact with a rigid disk 525 on a magnetic recording surface 530 during communication. The beam 285 is connected to a compact, mass balanced rotary actuator 535 that moves the chip 255 between numerous concentric data tracks of the surface 305 while the disk 525 spins in a direction shown by arrow S. Although not shown, a similar chip slides on an opposite magnetic recording surface of the disk 525, and typically several such disks each having a pair of chips sliding on opposite surfaces are included in a drive system. The drive 520 is designed to achieve substantially continuous sliding contact between the chip 255 and disk 525 at above 5000 RPM and linear velocities of above 10 m/s. This high resolution, continuous contact communication is made possible in part by the extremely small size and non-flying characteristics of the chip, which is constructed entirely from a composite of thin films, as well as the flexible, low load beam 505 and gimbal 500, which provide damage free conformance between the chip and the disk, and the specific surface characteristics of the disk, which are prepared for such sliding, so that the resulting drive system achieves a synergistic combination optimized to yield a continuously sliding, high density hard disk drive system.

What is claimed is:

1. A transducer for a rigid disk drive system, the transducer comprising a body having a mostly flat disk-facing surface and a protrusion extending from said surface, a magnetic loop contained in said body and extending further in a direction parallel to said surface than in a direction perpendicular to said surface, said loop extending along said surface beyond said protrusion and ending with first and second magnetic pole structures disposed in said protrusion, said pole structures separated by an amagnetic gap and terminating substantially coextensively with said protrusion, and a conductive coil disposed in said body and inductively coupled to said loop, whereby providing an electrical current to said coil induces a magnetic field adjacent to said pole structures for writing a magnetic pattern to a disk.

2. The transducer of claim 1, and further comprising a pair of support legs extending from said surface a similar direction and extent as said protrusion.

3. The transducer of claim 1, wherein said disk-facing surface is formed primarily of at least one thin layer of materials.

4. The transducer of claim 1, wherein a portion of said loop has a magnetic saturation level that is less than that of said pole structures.

5. The transducer of claim 1, wherein said body has a conductive lead connected to said coil and piercing an insulative shell of said body on a side opposite to said disk-facing surface.

6. The transducer of claim 1, wherein said pole structures have a pair of substantially parallel walls adjoining said gap that extend greater than four times as far in a vertical direction as a distance between said walls.

7. The transducer of claim 1, wherein said body is primarily composed of a plurality of adjoining material layers, with a majority of said layers being oriented predominantly parallel to each other and transversely to a layer which is disposed in said gap.

8. A transducer for a rigid disk drive system, the transducer comprising a plank-shaped body supported by at least one microscopic protrusion, said body having a length, a width and a thickness, a conductive coil disposed in a part of said body excluding said protrusion, and a magnetic core disposed in said body and inductively coupled to said coil, said core shaped as a loop extending further in a direction of said length than in a direction of said thickness and having ends terminating substantially coextensively with said protrusion and separated by an amagnetic gap, whereby a current flow in said coil produces a magnetic field adjacent to said protrusion.

9. The transducer of claims 8, wherein said ends are encompassed by a durable amagnetic material.

10. The transducer of claim 8, wherein said ends have a pair of substantially parallel walls adjoining said gap that extend greater than four times as far in a vertical direction as said separation between said walls.

11. The transducer of claim 8, wherein said body is primarily made of a composite of thin layers of materials.

12. The transducer of claim 11, wherein said gap is one of said layers and is formed in an orientation generally orthogonal compared to most of said layers.

13. The transducer of claim 8, wherein said body is supported by a plurality of microscopic protrusions.

14. The transducer of claim 8, wherein said body is supported by a trio of microscopic protrusions.

15. The transducer of claim 14, wherein said protrusions are legs.

16. An information storage device comprising a rigid disk having a surface associated with a magnetic medium layer, a slider having a disk-facing surface and a projection from said disk-facing surface disposed in a mostly sliding relationship with said disk surface, and a transducer disposed in said slider and having a magnetic core and a conductive coil coupled to said core, said core forming a loop extending further in a direction parallel than perpendicular to said disk-facing surface, with closely spaced ends extending into said projection and terminating adjacent to said disk surface.

17. The device of claim 16, and further comprising a pair of spaced apart support legs projecting from said disk-facing surface in a direction substantially similar to that of said projection.

18. The device of claim 16, wherein said loop has a generally symmetric shape that extends furthest in a direction transverse to said projection.

19. The device of claim 16, wherein said slider has a conductive lead connected to said coil, piercing an insulative shell of said slider and protruding away from said disk.

20. The device of claim 16, wherein said ends have a pair of substantially parallel walls separated by an amagnetic gap, said walls extending more than four times as far in a direction substantially normal to said surface as said separation between said walls.

* * * * *